United States Patent
Matsushima

(10) Patent No.: US 10,740,077 B2
(45) Date of Patent: Aug. 11, 2020

(54) INFORMATION PROCESSING SYSTEM AND INFORMATION PROCESSING APPARATUS FOR FACILITATING INSTALLATION OF APPLICATIONS OBTAINED FROM SERVER ON A NETWORKED ELECTRONIC DEVICE

(71) Applicant: Hiroyuki Matsushima, Kanagawa (JP)

(72) Inventor: Hiroyuki Matsushima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 34 days.

(21) Appl. No.: 15/455,514

(22) Filed: Mar. 10, 2017

(65) Prior Publication Data
US 2017/0269917 A1  Sep. 21, 2017

(30) Foreign Application Priority Data

Mar. 18, 2016 (JP) .................. 2016-056193
Mar. 18, 2016 (JP) .................. 2016-056237
Feb. 2, 2017 (JP) .................. 2017-017875

(51) Int. Cl.
*G06F 9/445* (2018.01)
*G06F 8/61* (2018.01)
(Continued)

(52) U.S. Cl.
CPC .............. *G06F 8/61* (2013.01); *G06F 21/105* (2013.01); *G06F 21/12* (2013.01); *H04N 1/0097* (2013.01);
(Continued)

(58) Field of Classification Search
CPC ....................................................... G06F 8/61
See application file for complete search history.

(56) References Cited

U.S. PATENT DOCUMENTS 6,889,376 B1 * 5/2005 Barritz .................. G06F 9/4451
717/169
7,117,493 B2  10/2006 Matsushima
(Continued)

FOREIGN PATENT DOCUMENTS

JP  2002-152458  5/2002
JP  2006-018402  1/2006
(Continued)

*Primary Examiner* — Hang Pan
(74) *Attorney, Agent, or Firm* — IPUSA, PLLC

(57) ABSTRACT

An information processing system including an information processing apparatus and an electronic device is provided for introducing an application stored in the information processing apparatus to the electronic device. The information processing apparatus includes a first processor configured to execute a first program to implement processes of storing and managing configuration information that is necessary for introducing an application to the electronic device, the configuration information including a list of one or more applications to be introduced and license information associated with the one or more applications that is necessary for introducing the one or more applications. The electronic device includes a second processor configured to execute a second program to implement processes of acquiring the configuration information from the information processing apparatus, acquiring the one or more applications from the information processing apparatus based on the acquired configuration information, and introducing the acquired one or more applications.

20 Claims, 44 Drawing Sheets

(51) Int. Cl.
*G06F 21/12* (2013.01)
*G06F 21/10* (2013.01)
*H04N 1/00* (2006.01)
*H04N 1/44* (2006.01)

(52) U.S. Cl.
CPC ..... *H04N 1/00474* (2013.01); *H04N 1/00938* (2013.01); *H04N 1/4413* (2013.01); *H04N 1/4433* (2013.01)

(56) References Cited

U.S. PATENT DOCUMENTS

| | | | |
|---|---|---|---|
| 8,351,608 B2 | 1/2013 | Kobayashi | |
| 8,650,557 B2 | 2/2014 | Ogura | |
| 2007/0255798 A1* | 11/2007 | Schneider | G06F 9/5077 709/217 |
| 2010/0233996 A1* | 9/2010 | Herz | H04L 63/08 455/411 |
| 2011/0087869 A1* | 4/2011 | Teranoshita | H04L 41/0806 713/1 |
| 2013/0104120 A1* | 4/2013 | Arrizza | G06F 8/65 717/173 |
| 2014/0263612 A1* | 9/2014 | Warren | H04L 12/2807 235/375 |
| 2015/0254067 A1* | 9/2015 | Nigam | H04L 41/0843 717/175 |

FOREIGN PATENT DOCUMENTS

| | | |
|---|---|---|
| JP | 2006-217320 | 8/2006 |
| JP | 2009-271680 | 11/2009 |
| JP | 2011-248776 | 12/2011 |
| JP | 2013-131090 | 7/2013 |
| JP | 2015-121919 | 7/2015 |

* cited by examiner

FIG.5

| TENANT ID | DEVICE CONFIGURATION INFORMATION ID | DEVICE NO. | STATUS | DESCRIPTION | CONFIGURATION FILE |
|---|---|---|---|---|---|
| Tenant1 | Conf_0000001 | Dev_000001 | COMPLETED | BUILDING A | Prefs_0000001.xml |
| Tenant1 | Conf_0000002 | Dev_000002 | COMPLETED | BUILDING B | Prefs_0000002.xml |
| Tenant2 | Conf_0000003 | | NOT REGISTERED | 1F | Prefs_0000003.xml |
| Tenant3 | Conf_0000004 | | NOT REGISTERED | GENERAL AFFAIRS DEPARTMENT | |
| Tenant3 | Conf_0000005 | | NOT REGISTERED | SALES DEPARTMENT | |

DEVICE NO.: EMPTY WHEN DEVICE IS NOT YET REGISTERED; STORED WHEN DEVICE IS REGISTERED
STATUS: NOT REGISTERED → INTRODUCING APPLICATION → CONFIGURING → COMPLETED

FIG.6

| DEVICE CONFIGURATION INFORMATION ID | APPLICATION ID | LICENSE KEY |
|---|---|---|
| Conf_0000001 | FreeApp_001 | Lic_001_999999 |
| Conf_0000002 | FreeApp_001 | Lic_001_999999 |
| Conf_0000003 | FreeApp_001 | Lic_001_999999 |
| Conf_0000003 | PaidApp_002 | Lic_002_000001 |
| Conf_0000004 | FreeApp_001 | Lic_001_999999 |
| Conf_0000005 | FreeApp_001 | Lic_001_999999 |
| Conf_0000005 | PaidApp_002 | Lic_002_000002 |

FIG.11

DEVICE CONFIGURATION INFORMATION MANAGEMENT TOOL

LOGIN

USER ID

PASSWORD

LOGIN

FIG.12

DEVICE CONFIGURATION INFORMATION MANAGEMENT TOOL

TENANT SELECTION

TENANT ID

OPEN

FIG.13

DEVICE CONFIGURATION INFORMATION MANAGEMENT TOOL

TENANT: Tenant1

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000001 | Dev_000001 | COMPLETED | BUILDING A | FreeApp_001 | DISPLAY | DUPLICATE |
| Conf_0000002 | Dev_000002 | COMPLETED | BUILDING B | FreeApp_001 | DISPLAY | DUPLICATE |

FIG.16

DEVICE CONFIGURATION INFORMATION MANAGEMENT TOOL

TENANT: Tenant2

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000003 | | NOT REGISTERED | 1F | [REGISTER] | [REGISTER] | |

FIG.20

DEVICE CONFIGURATION INFORMATION MANAGEMENT TOOL

TENANT: Tenant2

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000003 | | NOT REGISTERED | 1F | FreeApp_001<br>PaidApp_002 | DISPLAY | |

FIG.22

DEVICE CONFIGURATION APPLICATION

LOGIN

USER ID

PASSWORD

LOGIN

FIG.23A

```
GET /device/configs?deviceId=Dev_000003 HTTP/1.1
Host: www.example.com
Cookie: authTicket="xxxxxxxx"
```

FIG.23B

```
HTTP/1.1 200 OK
Content-Type: application/json; charset=UTF-8

[
  {
    "tenantId" : "Tenant2",
    "configId" : "Conf_0000003",
    "deviceId" : "",
    "status" : "Not Registered",
    "description" : "1F",
    "apps" : [
      { "appId" : "FreeApp_001", "licenseKey" : "Lic_001_999999" },
      { "appId" : "PaidApp_002", "licenseKey" : "Lic_002_000001" }
    ],
    "prefs" : "http://www.example.com/device/configs/Conf_0000003/Prefs_0000003.xml"
  }
]
```

FIG.24

DEVICE CONFIGURATION APPLICATION

| DESCRIPTION | APPLICATION | CONFIGURATION | INTRODUCTION START |
|---|---|---|---|
| 1F | FreeApp_001<br>PaidApp_002 | DISPLAY | INTRODUCE |

FIG.25

```
HTTP/1.1 200 OK
Content-Type: application/json; charset=UTF-8

[
  {
    "tenantId" : "Tenant3",
    "configId" : "Conf_0000004",
    "deviceId" : "",
    "status" : "Not Registered",
    "description" : "General Affairs Department",
    "apps" : [
      { "appId" : "FreeApp_001", "licenseKey" : "Lic_001_999999" }
    ],
    "prefs" : ""
  },
  {
    "tenantId" : "Tenant3",
    "configId" : "Conf_0000005",
    "deviceId" : "",
    "status" : "Not Registered",
    "description" : "Sales Department",
    "apps" : [
      { "appId" : "FreeApp_001", "licenseKey" : "Lic_001_999999" },
      { "appId" : "PaidApp_002", "licenseKey" : "Lic_002_000002" }
    ],
    "prefs" : ""
  }
]
```

FIG.26

DEVICE CONFIGURATION APPLICATION

| DESCRIPTION | APPLICATION | CONFIGURATION | INTRODUCTION START |
|---|---|---|---|
| GENERAL AFFAIRS DEPARTMENT | FreeApp_001 | NONE | INTRODUCE |
| SALES DEPARTMENT | FreeApp_001 PaidApp_002 | NONE | INTRODUCE |

FIG.27

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | INTRODUCING APPLICATION | 1F | Prefs_0000003.xml |

FIG.29

DEVICE CONFIGURATION INFORMATION MANAGEMENT TOOL

TENANT: Tenant2

NEW

DEVICE NO.

DESCRIPTION

CREATE

CANCEL

FIG.34

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | COMPLETED | 1F | Prefs_0000003.xml |

FIG.36

DEVICE CONFIGURATION INFORMATION MANAGEMENT TOOL

TENANT: Tenant2

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000003 | Dev_000003 | COMPLETED | 1F | FreeApp_001 PaidApp_002 | DISPLAY | DUPLICATE |

FIG.37

DEVICE CONFIGURATION INFORMATION MANAGEMENT TOOL

TENANT: Tenant2

DEVICE CONFIGURATION INFORMATION DUPLICATION

DUPLICATION SOURCE    Conf_0000003 (DEVICE NO.: Dev_000003)    ☐ LICENSE TRANSFER DESCRIPTION    DUPLICATE INFORMATION FROM 1F (Dev_000003)

[ DUPLICATE ]    [ CANCEL ]

FIG.38

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | COMPLETED | 1F | EXPORTING |
| Tenant2 | Conf_0000006 | | NOT REGISTERED | DUPLICATE INFORMATION FROM 1F (Dev_000003) | DUPLICATE FROM Conf_0000003 |

FIG.39

| DEVICE CONFIGURATION INFORMATION ID | APPLICATION ID | LICENSE KEY |
|---|---|---|
| Conf_0000003 | FreeApp_001 | Lic_001_999999 |
| Conf_0000003 | PaidApp_002 | Lic_002_000001 |
| Conf_0000006 | FreeApp_001 | Lic_001_999999 |
| Conf_0000006 | PaidApp_002 | |

FIG.40

| DEVICE CONFIGURATION INFORMATION ID | APPLICATION ID | LICENSE KEY |
|---|---|---|
| Conf_0000006 | PaidApp_002 | Lic_002_000003 |

FIG.41

DEVICE CONFIGURATION INFORMATION MANAGEMENT TOOL

TENANT: Tenant2

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000003 | Dev_000003 | COMPLETED | 1F | FreeApp_001 PaidApp_002 | EXPORTING | DUPLICATE |
| Conf_0000006 | | NOT REGISTERED | DUPLICATE INFORMATION FROM 1F (Dev_000003) | FreeApp_001 PaidApp_002 | DUPLICATE FROM Conf_0000003 | |

FIG.42

| DEVICE CONFIGURATION INFORMATION ID | APPLICATION ID | LICENSE KEY |
|---|---|---|
| Conf_0000003 | FreeApp_001 | Lic_001_999999 |
| Conf_0000003 | PaidApp_002 | Lic_002_000001 (INVALIDATING) |
| Conf_0000006 | FreeApp_001 | Lic_001_999999 |
| Conf_0000006 | PaidApp_002 | Lic_002_000001 (Conf_0000003) |

FIG.43

DEVICE CONFIGURATION INFORMATION MANAGEMENT TOOL

TENANT: Tenant2

NEW

| DEVICE CONFIGURATION INFORMATION ID | DEVICE NO. | STATUS | DESCRIPTION | APPLICATION | CONFIGU-RATION | DUPLICATE |
|---|---|---|---|---|---|---|
| Conf_0000003 | Dev_000003 | COMPLETED | 1F | FreeApp_001 PaidApp_002 (INVALIDATING) | EXPORTING | DUPLICATE |
| Conf_0000006 | | NOT REGISTERED | DUPLICATE INFORMATION FROM 1F (Dev_000003) | FreeApp_001 PaidApp_002 (TRANSFERRING LICENSE) | DUPLICATE FROM Conf_0000003 | |

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | COMPLETED | 1F | Prefs_0000004.xml |
| Tenant2 | Conf_0000006 | | NOT REGISTERED | DUPLICATE INFORMATION FROM 1F (Dev_000003) | DUPLICATE FROM Conf_0000003 |

| DEVICE CONFIGURATION INFORMATION ID | APPLICATION ID | LICENSE KEY |
|---|---|---|
| Conf_0000003 | FreeApp_001 | Lic_001_999999 |
| Conf_0000003 | PaidApp_002 | UNINSTALLED |
| Conf_0000006 | FreeApp_001 | Lic_001_999999 |
| Conf_0000006 | PaidApp_002 | Lic_002_000001 (Conf_0000003) |

FIG.49

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | COMPLETED | 1F | Prefs_0000004.xml |
| Tenant2 | Conf_0000006 | Dev_000004 | INTRODUCING APPLICATION | DUPLICATE INFORMATION FROM 1F (Dev_000003) | DUPLICATE FROM Conf_0000003 |

FIG.50

| DEVICE CONFIGURATION INFORMATION ID | APPLICATION ID | LICENSE KEY |
|---|---|---|
| Conf_0000003 | FreeApp_001 | Lic_001_999999 |
| Conf_0000003 | PaidApp_002 | UNINSTALLED |
| Conf_0000006 | FreeApp_001 | Lic_001_999999 |
| Conf_0000006 | PaidApp_002 | Lic_002_000001 |

FIG.51

| TENANT ID | DEVICE CONFIGURATION INFORMATION ID | DEVICE NO. | STATUS | DESCRIPTION | CONFIGURATION FILE |
|---|---|---|---|---|---|
| Tenant2 | Conf_0000003 | Dev_000003 | COMPLETED | 1F | Prefs_0000004.xml |
| Tenant2 | Conf_0000006 | Dev_000004 | COMPLETED | DUPLICATE INFORMATION FROM 1F (Dev_000003) | Prefs_0000004.xml |

INFORMATION PROCESSING SYSTEM AND INFORMATION PROCESSING APPARATUS FOR FACILITATING INSTALLATION OF APPLICATIONS OBTAINED FROM SERVER ON A NETWORKED ELECTRONIC DEVICE

CROSS-REFERENCE TO RELATED APPLICATIONS

The present application claims priority under 35 U.S.C. § 119 to Japanese Patent Application No. 2016-056193 filed on Mar. 18, 2016, Japanese Patent Application No. 2016-056237 filed on Mar. 18, 2016, and Japanese Patent Application No. 2017-017875 filed on Feb. 2, 2017, the entire contents of which are incorporated herein by reference.

BACKGROUND OF THE INVENTION

1. Field of the Invention

The present disclosure relates to an information processing system, an application introducing method, and an information processing apparatus.

2. Description of the Related Art

In recent years, applications to be installed in electronic devices, such as image forming apparatuses, are becoming available for download at an application market, for example. The application market is a generic term for online services constructed for the purpose of distributing applications.

For example, when an image forming apparatus is delivered to a site of a customer, a service person may perform operations for installing an application in the image forming apparatus on the day of delivery. However, other related operations such as license registration may also be necessary.

SUMMARY OF THE INVENTION

According to one embodiment of the present invention, an information processing system including an information processing apparatus and an electronic device is provided for introducing an application stored in the information processing apparatus to the electronic device. The information processing apparatus includes a first processor configured to execute a first program stored in a first memory to implement processes of storing and managing configuration information that is necessary for introducing an application to the electronic device, the configuration information including a list of one or more applications to be introduced and license information associated with the one or more applications that is necessary for introducing the one or more applications. The electronic device includes a second processor configured to execute a second program stored in a second memory to implement processes of acquiring the configuration information from the information processing apparatus, and acquiring the one or more applications from the information processing apparatus based on the acquired configuration information and introducing the acquired one or more applications.

BRIEF DESCRIPTION OF THE DRAWINGS

FIG. 5 illustrates an example configuration of a device configuration information table;

FIG. 6 illustrates an example configuration of an application configuration information table;

FIG. 11 illustrates an example login screen of a device configuration information management tool;

FIG. 12 illustrates an example tenant selection screen;

FIG. 13 illustrates an example device configuration information management screen;

FIG. 16 illustrates an example device configuration information management screen including newly generated device configuration information;

FIG. 20 illustrates an example device configuration information management screen after application registration and configuration file registration are completed;

FIG. 22 illustrates an example login screen for a device configuration application;

FIGS. 23A and 23B illustrate examples of a search request for device configuration information and a response to the search request;

FIG. 24 illustrates an example device configuration information selection screen generated based on the response of FIG. 23B;

FIG. 25 illustrates an example response to a device configuration information search request including a plurality of records of device configuration information;

FIG. 26 illustrates an example device configuration information selection screen generated based on the response of FIG. 25;

FIG. 27 illustrates an example of device configuration information while an application is being introduced;

FIG. 29 illustrates another example new device configuration information generation screen;

FIG. 34 illustrates an example of device configuration information when application introduction has been completed;

FIG. 36 illustrates another example device configuration information management screen;

FIG. 37 illustrates an example device configuration information duplication screen;

FIG. 38 illustrates an example record of device configuration information added to a device configuration information table in a case where license transfer is not necessary;

FIG. 39 illustrates example records of application configuration information added to an application configuration information table in the case where license transfer is not necessary;

FIG. 40 illustrates an example record of application configuration information having a license key registered therein;

FIG. 41 illustrates an example device configuration information management screen displaying duplicated device configuration information;

FIG. 42 illustrates example records of application configuration information added to an application configuration information table in a case where license transfer is necessary;

FIG. 43 illustrates another example device configuration information management screen displaying duplicated device configuration information;

FIG. 49 illustrates an example device configuration information table having a record with a device number registered therein;

FIG. 50 illustrates an example application configuration information table after license key information is updated;

FIG. 51 illustrates an example device configuration information table after configuration file information is updated.

DESCRIPTION OF THE EMBODIMENTS

In the case of providing solution products, for example, an electronic device and applications for fulfilling specific customer needs are often proposed and sold as a package. Even when the application to be used is determined in advance as in the above case, an application is typically downloaded manually from an application market and installed in the electronic device. Thus, operations for installing an application in an electronic device, such as an image forming apparatus, have been rather inconvenient.

An aspect of the present invention is directed to providing an information processing system that can facilitate introducing an application to an electronic device.

In the following, embodiments of the present invention are described with reference to the accompanying drawings.

First Embodiment

<System Configuration>

Figure 1:
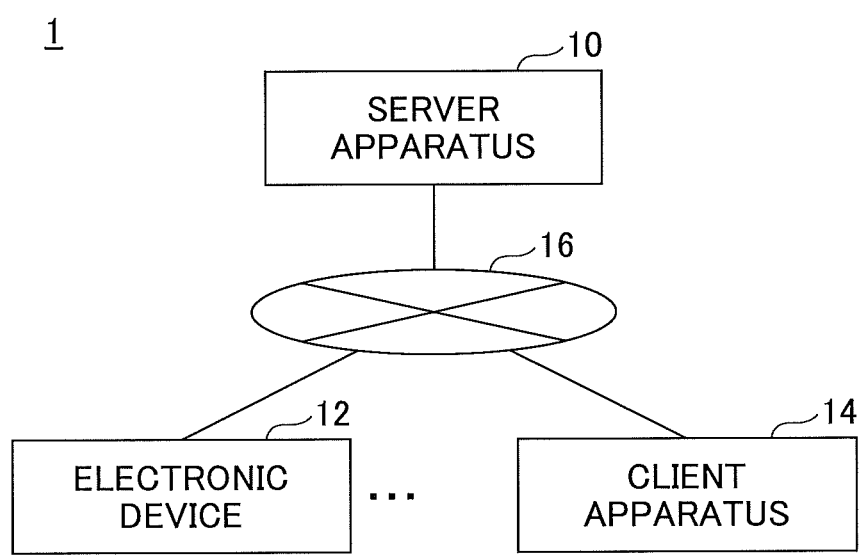
FIG. 1 is a diagram illustrating an example system configuration of an information processing system according to an embodiment of the present invention.

First, the system configuration of an information processing system 1 according an embodiment of the present invention is described with reference to FIG. 1. FIG. 1 illustrates an example system configuration of the information processing system 1 according to the present embodiment.

In FIG. 1, the information processing system 1 includes a server apparatus 10, an electronic device 12, and a client apparatus 14 that are communicably connected via a wide area network 16 such as the Internet.

The server apparatus 10 is an example of an information processing apparatus that provides various services, such as a cloud service, to the electronic device 12 and the client apparatus 14 via the network 16. Note that the present embodiment can be implemented with respect to various services provided via the network 16, such as a service provided by an ASP (Application Service Provider) and a web service as well as a cloud service. Also, the server apparatus 10 may be implemented by one or more information processing apparatuses.

The electronic device 12 may be an image forming apparatus or some other type of device to which an application downloaded from the server apparatus 10 is introduced (installed). Examples of image forming apparatuses include a multifunction peripheral (MFP), a scanner, a printer, a facsimile machine, an electronic blackboard, a projector, and the like. In the present embodiment, after the electronic device 12 is delivered to a tenant organization, such as a user company, a school, or a hospital, an application downloaded from the server apparatus 10 is installed in the electronic device 12. Note that the information processing system 1 may include one or more electronic devices 12.

The client apparatus 14 may be operated by an operator, such as an employee of a vendor company, for example. In the present embodiment, the operator operates the client apparatus 14 to register device configuration information and application configuration information (described below) in the server apparatus 10. Also, the operator may operate the client apparatus 14 to duplicate the device configuration information and the application configuration information as described below.

By having the operator register the device configuration information and the application configuration information (described below) in the server apparatus 10 via the client apparatus 14, operations for installing an application in the electronic device 12 may be facilitated in the information processing system 1 of FIG. 1.

Also, by having the operator duplicate the device configuration information and the application configuration information (described below) via the client apparatus 14, operations for installing an application in an electronic device 12 that is provided as a replacement or an addition to an existing electronic device may be facilitated in the information processing system 1 of FIG. 1.

<Hardware Configuration>

<<Computer>>

Figure 2:
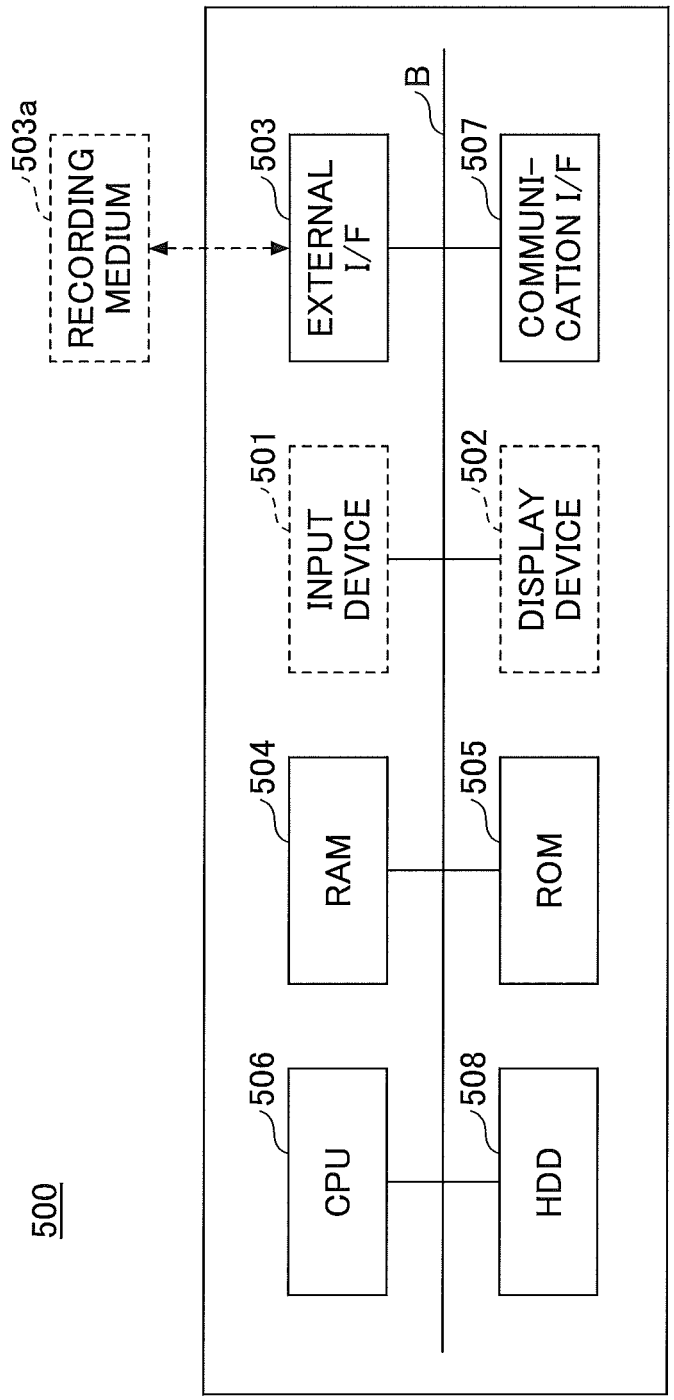
FIG. 2 is a diagram illustrating an example hardware configuration of a computer according an embodiment of the present invention.

The server apparatus 10 and the client apparatus 14 may be implemented by a computer having a hardware configuration as illustrated in FIG. 2, for example. FIG. 2 illustrates an example hardware configuration of a computer 500 according to the present embodiment.

In FIG. 2, the computer 500 includes an input device 501, a display device 502, an external I/F (interface) 503, a RAM (Random Access Memory) 504, a ROM (Read-Only Memory) 505, a CPU (Central Processing Unit) 506, a communication I/F 507, and an HDD (Hard Disk Drive) 508 that are connected via a bus B. Note that in some embodiments, the input device 501 and/or the display device 502 may be connected to the computer 500 as necessary, for example.

The input device 501 may include a keyboard, a mouse and/or a touch panel, for example, and is used by a user to input operation signals. The display device 502 may include a display for displaying information such as processing results of the computer 500, for example.

The communication I/F 507 is an interface for connecting the computer 500 to various networks. In this way, the computer 500 can establish data communication via the communication I/F 507.

The HDD 508 is an example of a nonvolatile storage device that stores programs and data. The stored programs and data may include an OS corresponding to basic software for controlling the entire computer 500 and application programs for implementing various functions on the OS. Note that the computer 500 may also use a drive device, such as such as a solid state drive (SSD), that uses a flash memory as a storage medium instead of the HDD 508, for example.

The external I/F 503 is an interface with an external device. The external device may be a recording medium 503a, for example. In this way, the computer 500 can read/write data from/onto the recording medium 503a via the external I/F 503. The recording medium 503a may be a flexible disk, a CD, a DVD, an SD memory card, or a USB memory, for example.

The ROM 505 is an example of a nonvolatile semiconductor memory (storage device) that can retain programs and data even when the power is turned off. The ROM 505 stores programs and data, such as a BIOS (Basic Input/Output System) that is executed when the computer 500 is activated, OS settings, and a network settings, for example. The RAM 504 is an example of a volatile semiconductor memory (storage device) that temporarily stores programs and data.

The CPU 506 is an arithmetic unit that implements control and functions of the entire computer 500 by reading programs and data from a storage device, such as the ROM 505 or the HDD 508, loading the programs and data into the RAM 504, and executing processes based on the loaded programs and data.

The server apparatus 10 and the client apparatus 14 may implement various processes as described below using one or more of the hardware elements of the computer 500 illustrated in FIG. 2, for example.

<<MFP>>

Figure 3:
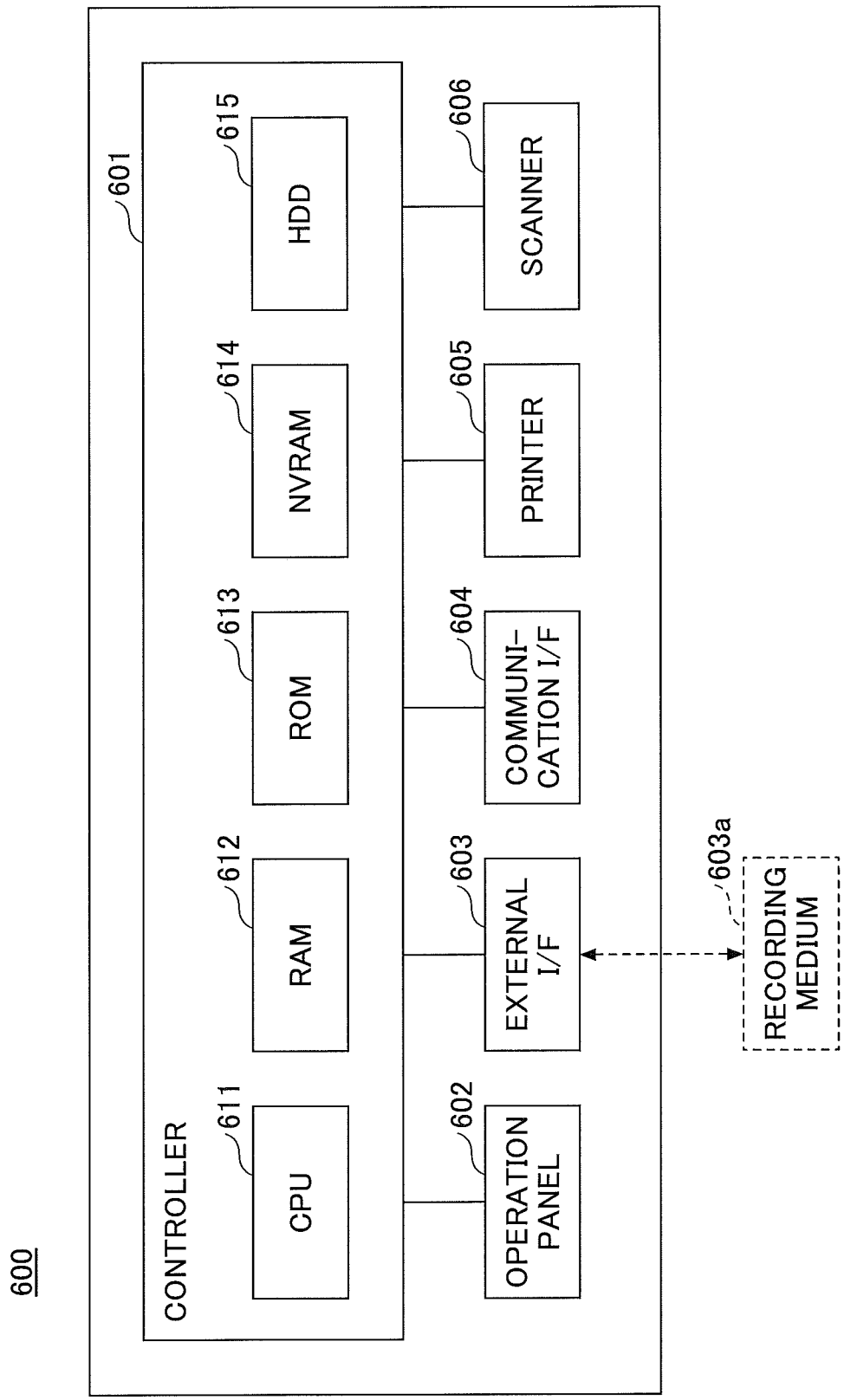
FIG. 3 is diagram illustrating an example hardware configuration of multifunction peripheral according to an embodiment of the present invention.

FIG. 3 illustrates an example hardware configuration of an MFP 600 as an example of the electronic device 12 illustrated in FIG. 1.

In FIG. 3, the MFP 600 includes a controller 601, an operation panel 602, an external I/F 603, a communication I/F 604, a printer 605, and a scanner 606. The controller 601 includes a CPU 611, a RAM 612, a ROM 613, an NVRAM 614, and an HDD 615. The ROM 613 stores various programs and data. The RAM 612 temporarily stores programs and data. The NVRAM 614 may store setting information and the like. The HDD 615 also stores various programs and data.

The CPU 611 reads programs, data, setting information, and the like from the ROM 613, the NVRAM 614, and/or the HDD 615, for example, loads the programs, data, and setting information in the RAM 612, and executes processes based thereon to implement control and functions of the entire MFP 600.

The operation panel 602 includes an input unit that accepts an input from the user and a display unit that displays information. The external I/F 603 is an interface with an external device. The external device may be a recording medium 603a, for example. In this way, the MFP 600 can read/write data from/onto the recording medium 603a via the external I/F 603. The recording medium 603a may be an IC card, a flexible disk, a CD, a DVD, an SD memory card, or a USB memory, for example.

The communication I/F 604 is an interface for connecting the MFP 600 to the network 16. In this way, the MFP 600 can establish data communication via the communication I/F 604. The printer 605 is a printing device for printing print data on a conveyed object. For example, the object to be conveyed may be paper, or some other medium, such as coated paper, cardboard, an OHP (Overhead Projector) sheet, a plastic film, prepreg, copper foil, and the like. The scanner 606 is a scanning device for scanning a document to acquire image data (electronic data) of the document and generating an image file (electronic file).

The electronic device 12 according to the present embodiment may have the hardware configuration as described above, for example, to thereby implement various processes as described below.

<Functional Configuration>

In the following, the functional configuration of the information processing system 1 according to the present embodiment is described.

<<Server Apparatus>>

Figure 4:
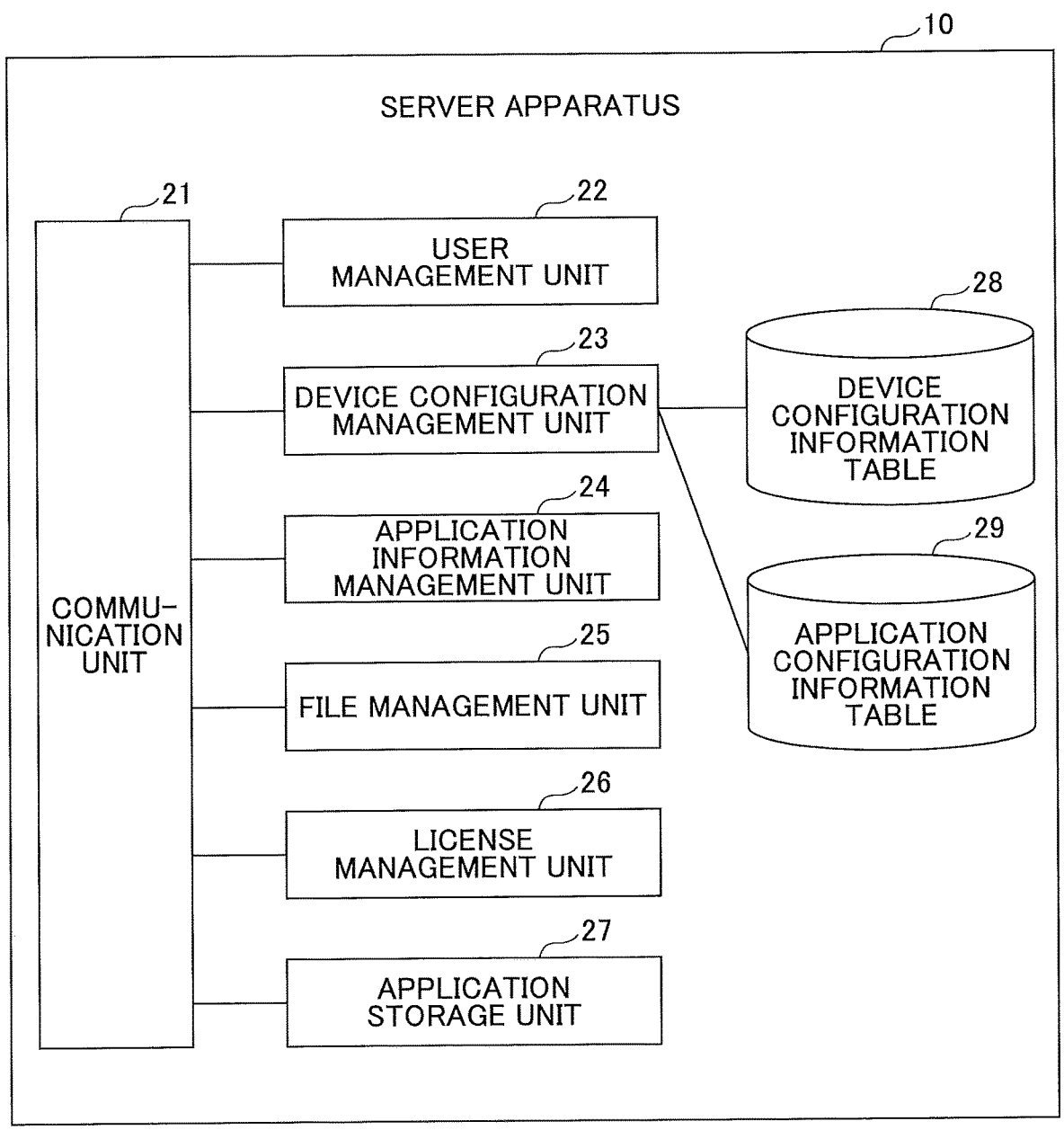
FIG. 4 is a diagram illustrating an example functional configuration of a server apparatus according to an embodiment of the present invention.

FIG. 4 is a diagram illustrating an example functional configuration of the server apparatus 10 according to the present embodiment. In FIG. 4, the server apparatus 10 includes a communication unit 21, a user management unit 22, a device configuration management unit 23, an application information management unit 24, a file management unit 25, a license management unit 26, an application storage unit 27, a device configuration information table 28, and an application configuration information table 29.

The communication unit 21 communicates with the electronic device 12 and the client apparatus 14. The user management unit 22 manages tenant information and user information necessary for user authentication. The user management unit 22 also performs user authentication.

The device configuration management unit 23 manages device configuration information and application configuration information (described below). Also, the device configuration management unit 23 performs device authentication. The application information management unit 24 manages application information. The application information may include various information items relating to an application, such as a name, a description, a license key of a free application, a region, and a compatible device model. The file management unit 25 manages configuration files (described below). The license management unit 26 manages licenses by issuing, validating, and invalidating licenses of applications, for example. The application storage unit 27 stores executable files of applications.

The device configuration information table 28 stores device configuration information as illustrated in FIG. 5, for example. FIG. 5 illustrates an example configuration of the device configuration information table 28. In FIG. 5, the device configuration information table includes information items "TENANT ID", "DEVICE CONFIGURATION INFORMATION ID", "DEVICE NO.", "STATUS", "DESCRIPTION", and "CONFIGURATION FILE".

The item "TENANT ID" is an example of organization identification information uniquely identifying an organization, such as a user company, a school, or a hospital, for example. The item "DEVICE CONFIGURATION INFORMATION ID" is an example of information uniquely identifying a record of device configuration information stored in the device configuration information table. The device configuration information ID is an example of information for enabling a user to distinguish one set of device configuration information from another. The item "DEVICE NO." is an example of device identification information uniquely identifying an electronic device 12 that has been registered. Note that the item "DEVICE NO." is left empty before the electronic device 12 is registered. Upon registering the electronic device 12, the device number of the electronic device 12 is stored in the item "DEVICE NO." of the device configuration information table.

The item "STATUS" stores the application introduction status of the electronic device 12. Example statuses that may be indicated include "NOT REGISTERED", "INTRODUCING APPLICATION", "CONFIGURING", AND "COMPLETED". The item "DESCRIPTION" is information to be displayed as a description of device configuration information on a device configuration information selection screen as described below. The description includes information for enabling a user to distinguish an electronic device 12 that is to use the device configuration information. The item "CONFIGURATION FILE" is an example of information uniquely identifying a configuration file registered for the device configuration information. In the device configuration information table of FIG. 5, one record (one set) of device configuration information is associated with one device number (one electronic device 12) when the electronic device 12 is registered.

The application configuration information table 29 of FIG. 4 stores application configuration information as illustrated in FIG. 6, for example. FIG. 6 illustrates an example configuration of the application configuration information table 29. In FIG. 6, the application configuration information table includes information items "DEVICE CONFIGURATION ID", "APPLICATION ID", AND "LICENSE KEY".

The item "DEVICE CONFIGURATION INFORMATION ID" is an example of information uniquely identifying a record of device configuration information stored in the device configuration information table. The item "APPLICATION ID" is an example of information uniquely identifying an application. The application ID is an example of information for enabling a user to distinguish one application from another. The item "LICENSE KEY" is information uniquely identifying the license key of the application identified by the application ID. Upon registration of an application, new application configuration information associated with a device configuration information ID is registered in the application configuration information table 29. In the application configuration information table of FIG. 6, a plurality of applications may be registered in association with one device configuration information ID.

In the following, the device configuration information of FIG. 5 and the application configuration information of FIG. 6 are described. For example, FIG. 5 and FIG. 6 indicate that an application with the application ID "FreeApp_001" has been installed in an electronic device 12 with the device number "Dev_000001" and an electronic device 12 with the device number "Dev_000002".

Also, FIGS. 5 and 6 indicate that device configuration information with the device configuration information ID "Conf_0000003" for which a device number is not registered is already registered in the application configuration information table. When a device number of an electronic device 12 is registered in association with the device configuration information with the device configuration information ID "Conf_0000003", applications with the application IDs "FreeApp_001" and "PaidApp_002" are installed in the registered electronic device 12.

Also, FIGS. 5 and 6 indicate that device configuration information with the device configuration information ID "Conf_0000004" for which a device number is not registered is already registered in the application configuration information table. When a device number of an electronic device 12 is registered in association with the device configuration information with the device configuration information ID "Conf_0000004", the application with the application ID "FreeApp-001" is installed in the registered electronic device 12.

Also, FIGS. 5 and 6 indicate that device configuration information with the device configuration information ID "Conf_0000005" for which a device number is not registered is already registered in the application configuration information table. When a device number of an electronic device 12 is registered in association with the device configuration information with the device configuration information ID "Conf_0000005", the applications with the application IDs "FreeApp_001" and "PaidApp_002" are installed in the registered electronic device 12.

<<Client Apparatus>>

Figure 7:
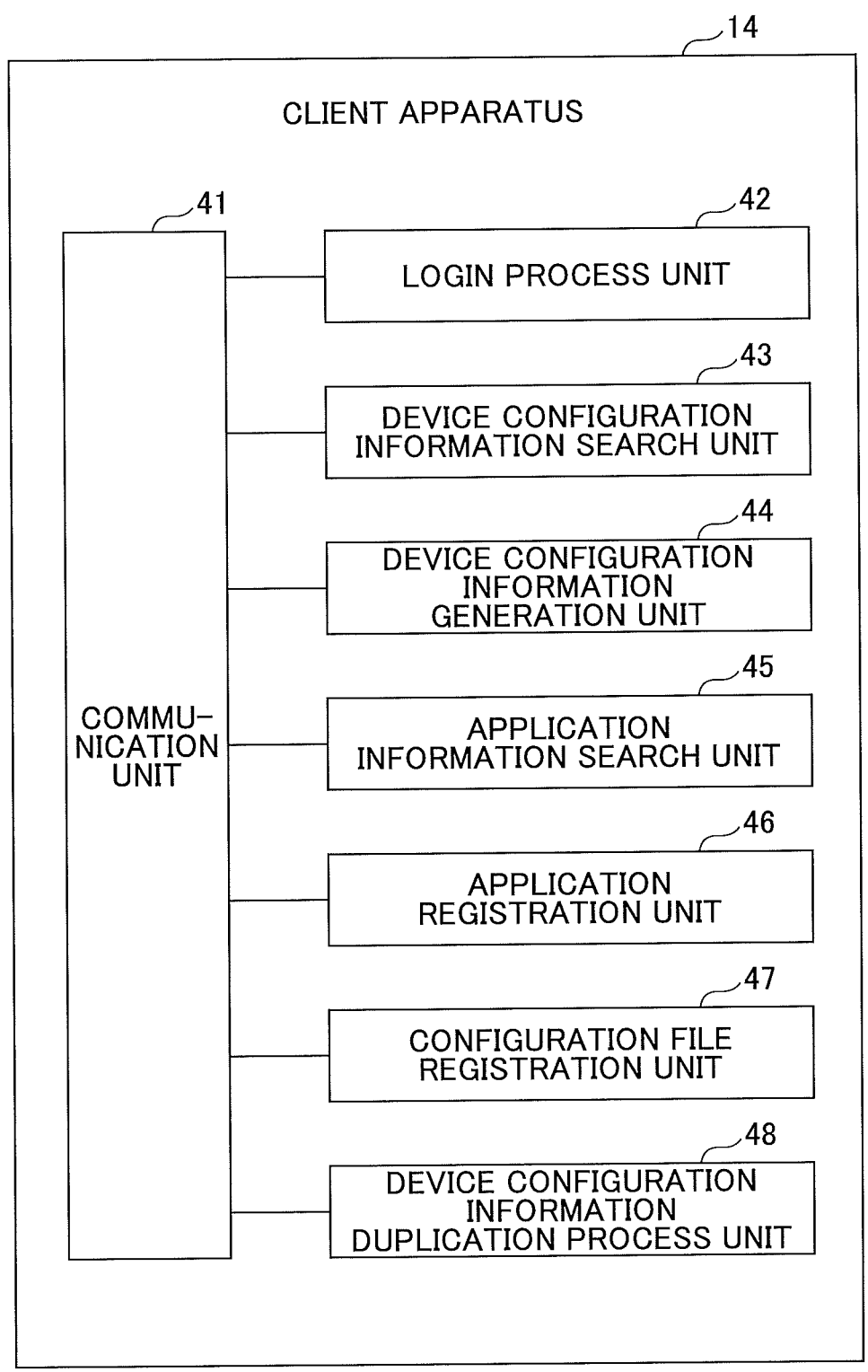
FIG. 7 is a diagram illustrating an example functional configuration of a client apparatus according to an embodiment of the present invention.

FIG. 7 is a diagram illustrating an example functional configuration of the client apparatus 14 according to the present embodiment. In FIG. 7, the client apparatus 14 includes a communication unit 41, a login process unit 42, a device configuration information search unit 43, a device configuration information generation unit 44, an application information search unit 45, an application registration unit 46, a configuration file registration unit 47, and a device configuration information duplication process unit 48. For example, the communication unit 41, the login process unit 42, the device configuration information search unit 43, the device configuration information generation unit 44, the application information search unit 45, the application registration unit 46, the configuration file registration unit 47, and the device configuration information duplication process unit 48 may be implemented by a web application executed on a browser.

The communication unit 41 communicates with the server apparatus 10. The login process unit 42 performs a login process for logging into the server apparatus 10. The device configuration information search unit 43 searches a device configuration information list registered in the server apparatus 10. The device configuration information generation unit 44 generates device configuration information and application configuration information to be stored in the server apparatus 10. The application information search unit 45 searches the application information registered in the server apparatus 10. The application registration unit 46 registers the application configuration information in the server apparatus 10. The configuration file registration unit 47 registers a configuration file in the server apparatus 10. The device configuration information duplication process unit 48 causes the server apparatus 10 to duplicate the device configuration information.

<<Electronic Device>>

Figure 8:
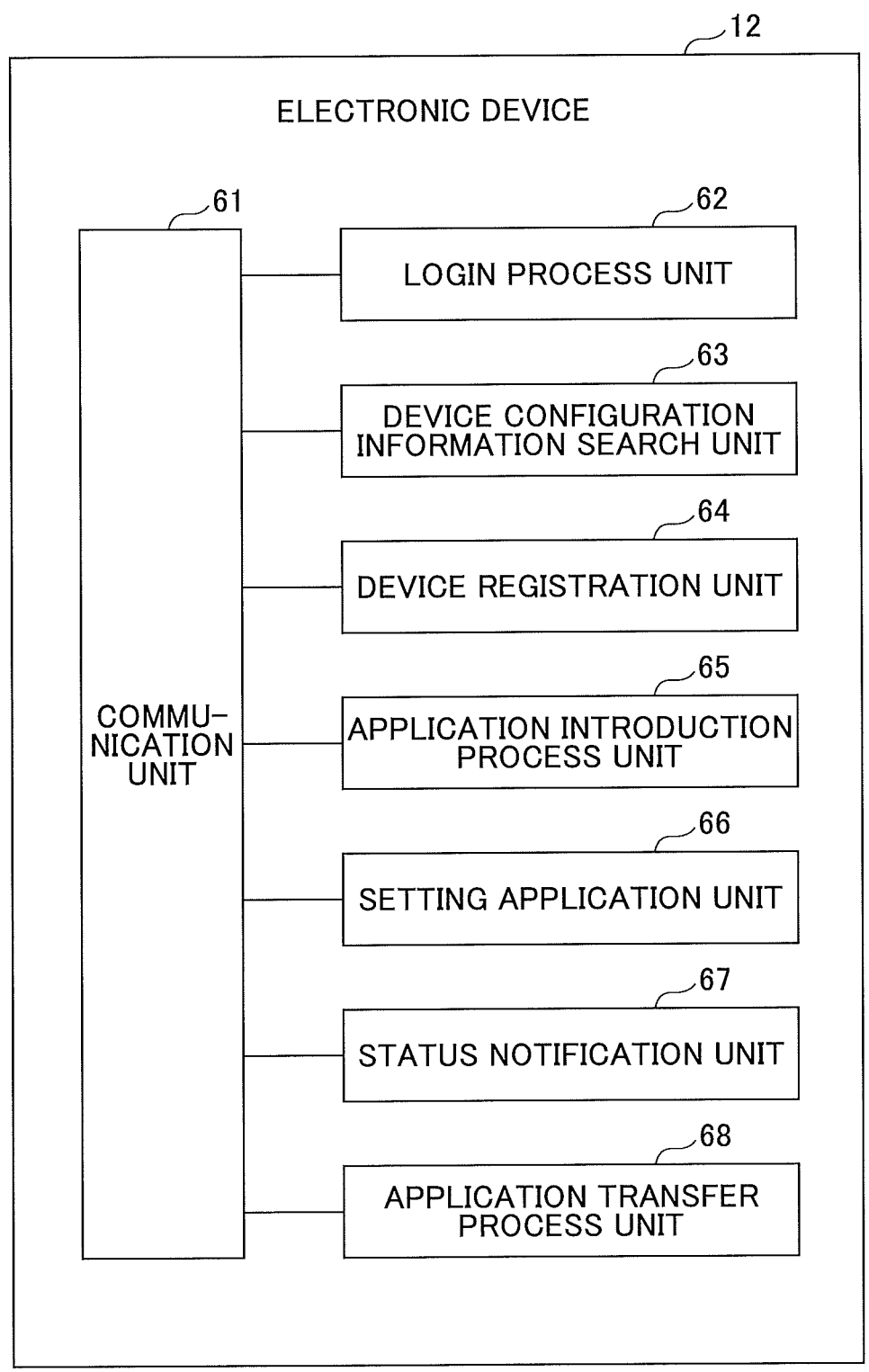
FIG. 8 is a diagram illustrating an example functional configuration of an electronic device according to an embodiment of the present invention.

FIG. 8 is a diagram illustrating an example functional configuration of the electronic device 12 according to the present embodiment. In FIG. 8, the electronic device 12 includes a communication unit 61, a login process unit 62, a device configuration information search unit 63, a device registration unit 64, an application introduction process unit 65, a setting application unit 66, a status notification unit 67, and an application transfer process unit 68. For example, the communication unit 61, the login process unit 62, the device configuration information search unit 63, the device registration unit 64, the application introduction process unit 65, the setting application unit 66, the status notification unit 67, and the application transfer process unit 68 of FIG. 8 may be implemented by an application run on the electronic devices 12.

The communication unit 61 communicates with the server apparatus 10. The login process unit 62 performs a login process for logging into the server apparatus 10. The device configuration information search unit 63 searches the device configuration information and the application configuration information registered in the server apparatus 10. The device registration unit 64 registers the electronic device 12 in the server apparatus 10. The application introduction process unit 65 performs a process of introducing an application to the electronic device 12. The setting application unit 66 acquires a configuration file from the server apparatus 10 and applies the settings specified in the configuration file. The status notifying unit 67 notifies the server apparatus 10 of the application introduction status.

The application transfer process unit 68 performs an application transfer process for introducing an application to a new electronic device 12 (duplication destination) that is provided as a replacement or an addition to an existing electronic device 12 (duplication source) so as that the new electronic device 12 may be in the same state as the existing electronic device 12.

<Process Details>

Figure 9:
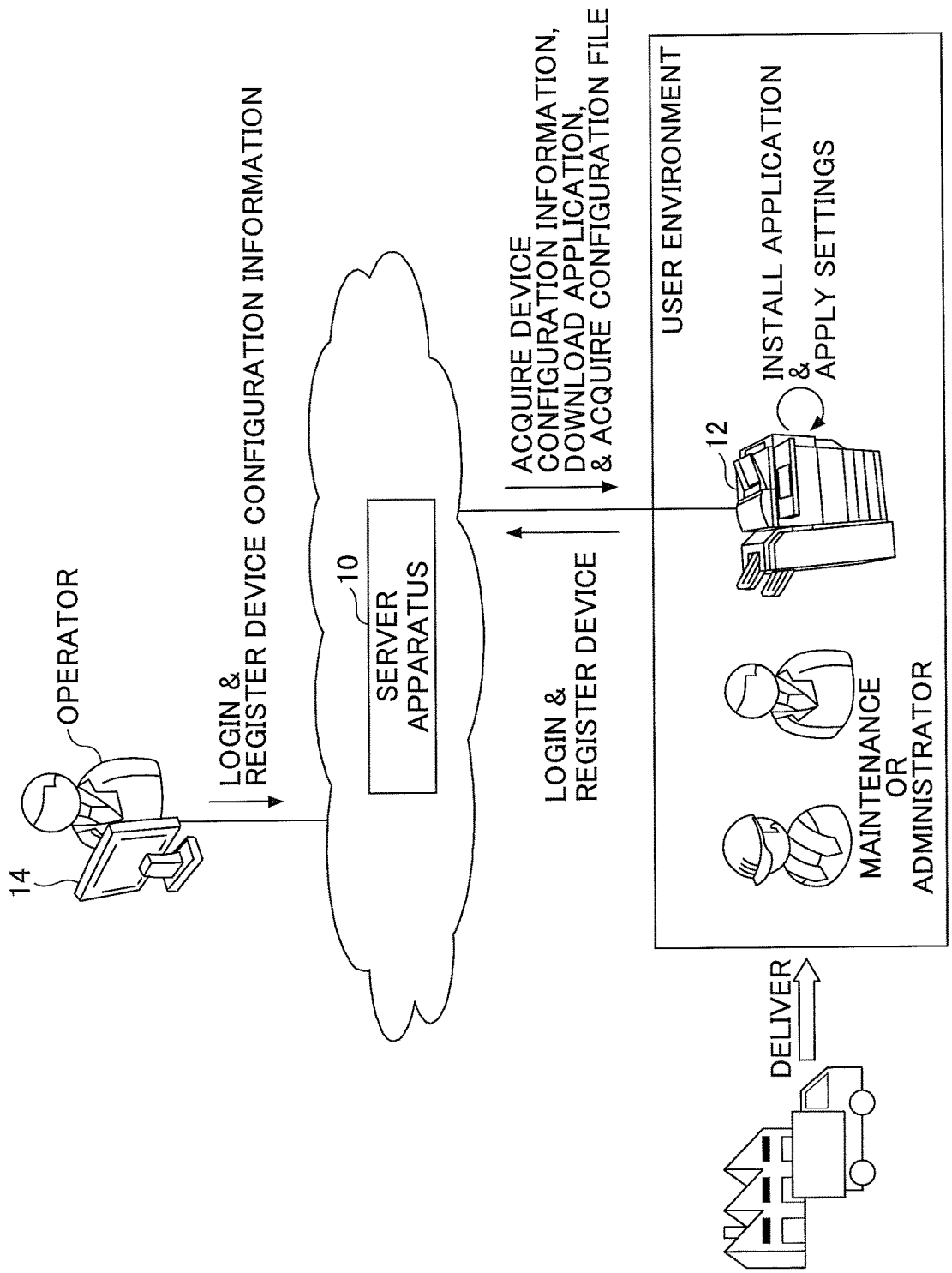
FIG. 9 is a diagram illustrating an example operation scenario for introducing an application to an electronic device using device configuration information.

In the following, process operations of the information processing system 1 according to the present embodiment are described in detail. In the example described below, it is assumed that an application is to be installed in a new electronic device 12. FIG. 9 illustrates an example operation scenario in which an operator operating the client apparatus 14 registers device configuration information in association with a tenant and uses the device configuration information to introduce an application to an electronic device 12. In FIG. 9, the operator logs into the server apparatus 10 via the client apparatus 14 and registers device configuration information in the server apparatus 10 in association with a tenant. That is, the operator registers the device configuration information in the server apparatus 10 in association with the tenant as preliminary operations.

After the electronic device 12 is delivered to a user environment, a user, such as a maintenance person or an administrator (hereinafter simply referred to as "administrator"), operates the electronic device 12 to perform an application introduction operation. The administrator operates the electronic device 12 and logs into the server apparatus 10. The electronic device 12 performs processes of specifying a tenant, acquiring device configuration information from the server apparatus 10, and registering the electronic device 12 in association with the device configuration information. The electronic device 12 downloads an application from the server apparatus 10 based on the device configuration information registered in association with the electronic device 12 and installs the downloaded application. Also, the electronic device 12 acquires a configuration file from the server apparatus 10 based on the device configuration information registered in associate with the electronic device 12 and applies the settings specified in the configuration file.

In the following, operations of the operator registering the device configuration information in advance via the client apparatus 14 and operations of the administrator introducing an application to the electronic device 12 are described in connection with the operation scenario of FIG. 9.

<<Device Configuration Information Registration Operation>>

Figure 10:
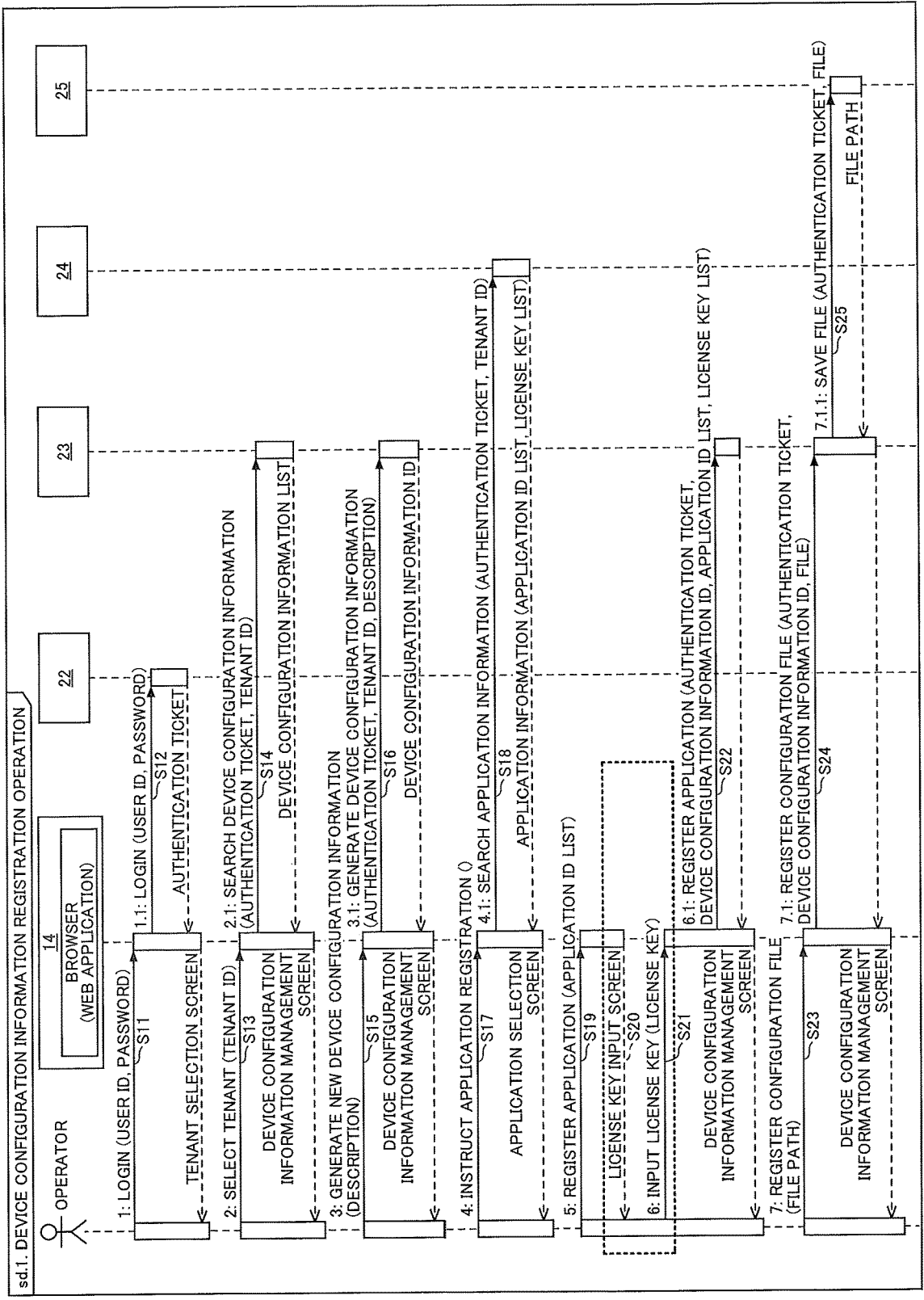
FIG. 10 is a sequence chart illustrating an example device configuration information registration operation.

FIG. 10 is a sequence chart illustrating example processes of a device configuration information operation. The operator accesses a device configuration information management tool from a browser running on the client apparatus 14 and causes the client apparatus 14 to display a login screen as illustrated in FIG. 11, for example. FIG. 11 is diagram illustrating an example login screen of the device configuration information management tool.

In step S11, the operator inputs a user ID and a password into the login screen of FIG. 11 and makes a login request. In step S12, the login process unit 42 of the client apparatus 14 requests the user management unit 22 of the server apparatus 10 to login with the user ID and password input to the login screen. The user management unit 22 performs user authentication and returns an authentication ticket to the client apparatus 14 if the login process is successful.

Upon receiving the authentication ticket from the server apparatus 10, the device configuration information search unit 43 of the client apparatus 14 displays a tenant selection screen as illustrated in FIG. 12, for example. FIG. 12 is a diagram illustrating an example tenant selection screen. Note that although the tenant selection screen of FIG. 12 prompts the operator to directly input a tenant ID, a tenant ID may also be selected from a tenant list, for example. Further, the tenant selection screen may enable a tenant to be selected by inputting a part of a tenant ID or a tenant name, for example.

In step S13, the operator inputs the tenant ID into the tenant selection screen of FIG. 12 and presses an "OPEN" button. In turn, the process proceeds to step S14 and the device configuration information search unit 43 requests the device configuration management unit 23 of the server apparatus 10 to search for corresponding device configuration information based on the tenant ID input to the tenant selection screen. The device configuration management unit 23 searches the device configuration information table 28 for device configuration information associated with the tenant ID and returns a device configuration information list.

Upon receiving the device configuration information list from the server apparatus 10, the device configuration information generation unit 44 of the client apparatus 14 displays a device configuration information management screen as illustrated in FIG. 13, for example. FIG. 13 is a diagram illustrating an example device configuration information management screen. Note that the device configuration information displayed in the device configuration information management screen of FIG. 13 is based on the device configuration information table of FIG. 5. The device configuration information management screen of FIG. 13 displays two records of device configuration information each indicating that application installation has been completed. Note that when a "DISPLAY" link in the device configuration information management screen of FIG. 13 is pressed, the device configuration information generation unit 44 displays the configuration file that has been applied. Also, when a "DUPLICATE" button displayed in the device configuration information management screen of FIG. 13 is pressed, the device configuration information duplication process unit 48 requests the server apparatus 10 to duplicate the corresponding device configuration information.

Figure 14:
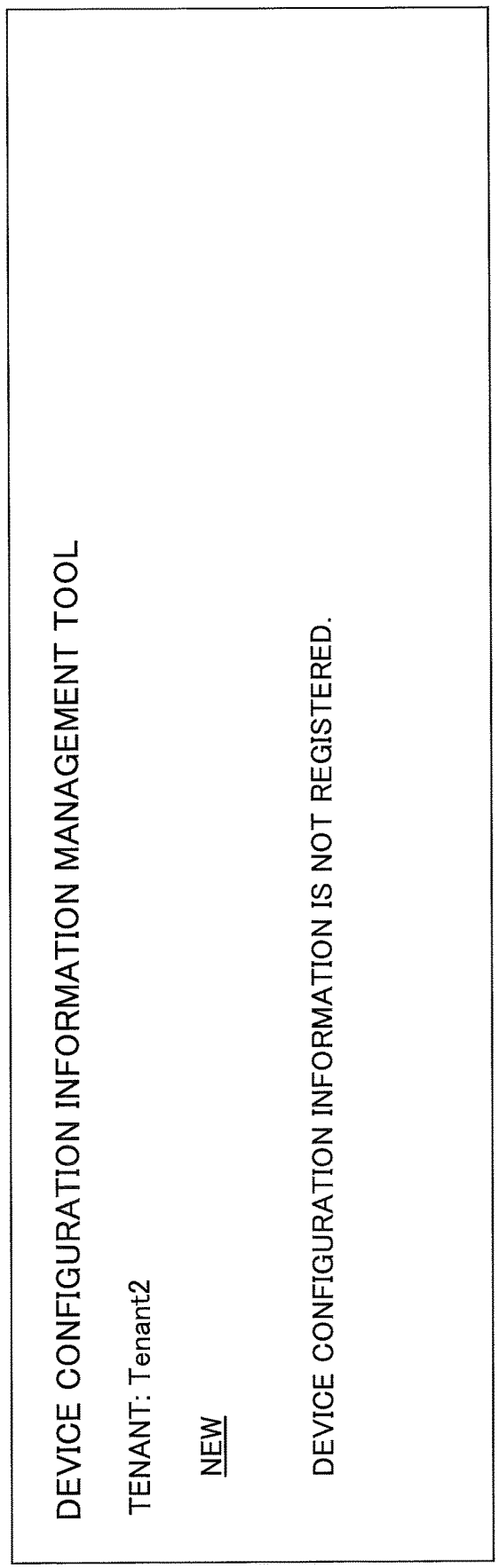
FIG. 14 illustrates an example device configuration information management screen in a case where device configuration information is not registered in association with a selected tenant.

When there is no device configuration information associated with the input tenant ID, the device configuration information generation unit 44 of the client apparatus 14 displays the device configuration information management screen as illustrated in FIG. 14, for example. FIG. 14 is a diagram illustrating an example device configuration information management screen in a case where no corresponding device configuration information is registered.

Figure 15:
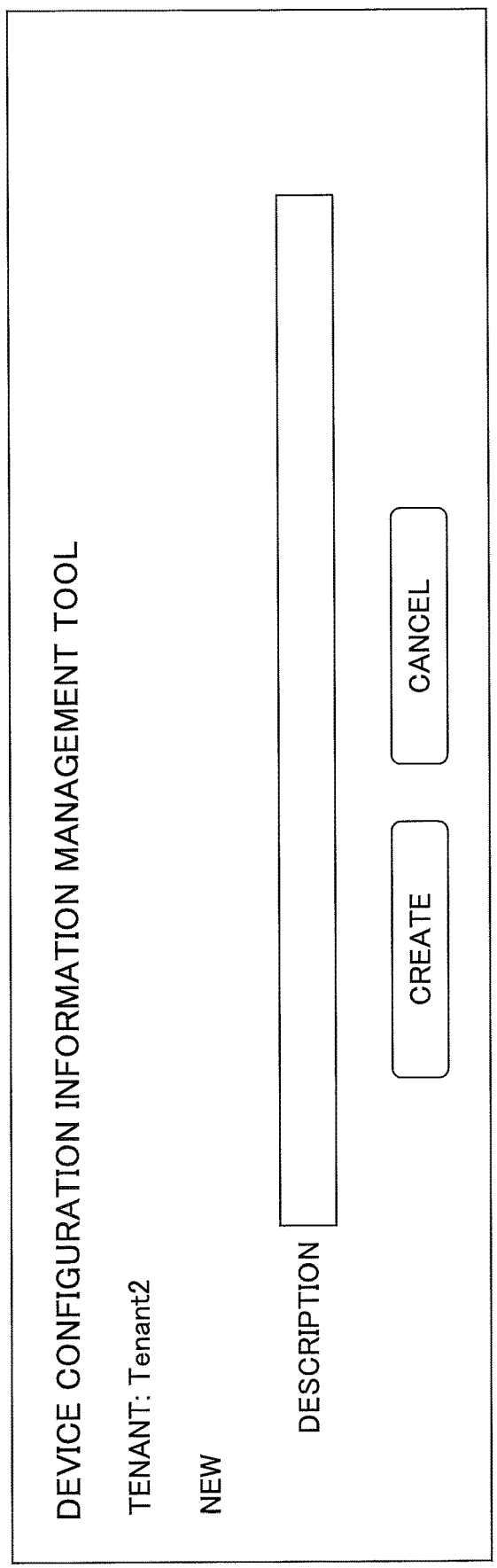
FIG. 15 illustrates an example new device configuration information generation screen.

By clicking on a "NEW" link in the device configuration information management screen of FIG. 13 or FIG. 14, the operator can cause the client apparatus 14 to display a new device configuration information generation screen as illustrated in FIG. 15, for example. FIG. 15 is a diagram illustrating an example new device configuration information generation screen. In step S15, the operator inputs a description to the new device configuration information generation screen of FIG. 15 and presses a "CREATE" button. In step S16, the device configuration information generation unit 44 specifies the description input to the new device configuration generation screen and requests the device configuration management unit 23 of the server apparatus 10 to generate device configuration information to be registered in association with the specified description.

The device configuration management unit 23 of the server apparatus 10 adds the device configuration information associated with the specified description to the device configuration information table 28 and transmits the device configuration information ID of the added device configuration information to the client apparatus 14. Upon receiving the device configuration information ID from the server apparatus 10, the device configuration information generation unit 44 of the client apparatus 14 displays a device configuration information management screen as illustrated in FIG. 16, for example.

FIG. 16 is a diagram illustrating an example device configuration information management screen including the newly generated device configuration information. Because the device configuration information displayed on the device configuration information management screen of FIG. 16 has just been newly generated, information for the items "APPLICATION" and "CONFIGURATION" are not yet registered. As such, "REGISTER" links are displayed in the fields for the above items "APPLICATION" and "CON-FIGURATION" in the device configuration information management screen of FIG. 16. Note that a "DUPLICATE" button is not displayed in the field for the item "DUPLICATE" in the device configuration information management screen of FIG. 16.

Then, in step S17, the operator instructs the client apparatus 14 to perform an application registration process by pressing the "REGISTER" link under the item "APPLICATION" in the device configuration information management screen of FIG. 16, for example. In step S18, the application information searching unit 45 of the client apparatus 14 specifies the tenant ID selected in step S13 and requests the application information management unit 24 of the server apparatus 10 to search for corresponding application information.

The application information management unit 24 of the server apparatus 10 returns application information including the application ID and the license key of one or more applications to the client apparatus 14. The license key included in the application information is a license key necessary for installing a free application.

Note that the application information returned to the client apparatus 14 may be application information of one or more applications that the operator is authorized to register, or application information of one or more applications that are publicly available in the tenant's region, for example.

Figure 17:
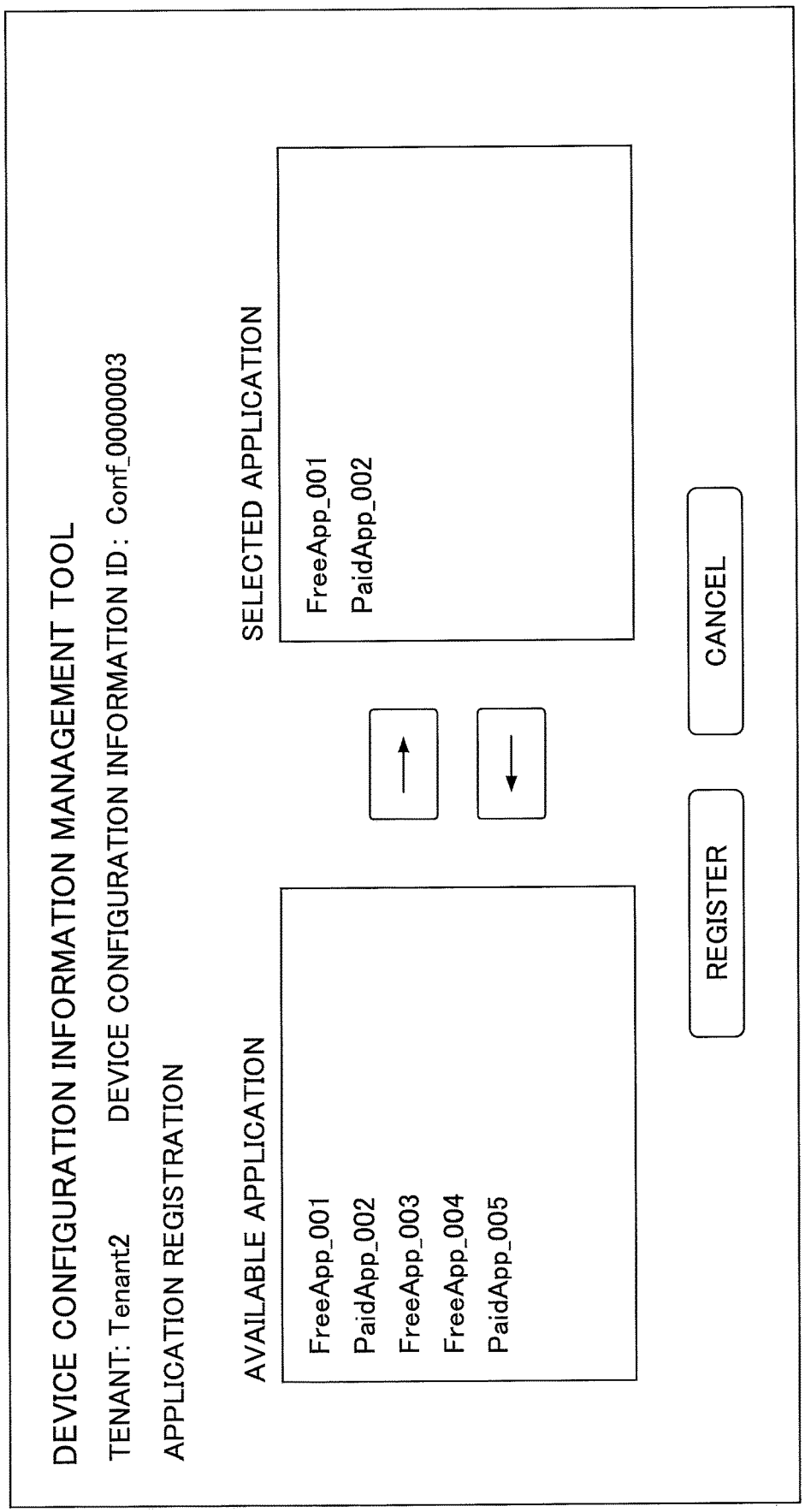
FIG. 17 illustrates an example application selection screen.

Upon receiving the application information from the server apparatus 10, the application registration unit 46 of the client apparatus 14 displays an application selection screen as illustrated in FIG. 17, for example. FIG. 17 is a diagram illustrating an example application selection screen. The application registration unit 46 displays the application IDs included in the application information from the server apparatus 10 as a list under "AVAILABLE APPLICATION" in the application selection screen of FIG. 17. Note that when the names descriptions of applications are included in the application information from the server apparatus 100, for example, the application registration unit 46 may also display the names and descriptions of the available applications in the application selection screen.

The operator of the client apparatus 14 may operate the application selection screen of FIG. 17 to add one or more application IDs listed under "AVAILABLE APPLICATION" to "SELECTED APPLICATION", or delete one or more application IDs listed under "SELECTED APPLICATION", for example.

In step S19, the operator issues a request for registering the applications identified by the application IDs listed under "SELECTED APPLICATION" in the device configuration information by pressing a "REGISTER" button in the application selection screen of FIG. 17, for example. In step S20, the application registration unit 46 of the client apparatus 14 displays a license key input screen with respect to an application ID among the application IDs listed under "SELECTED APPLICATION" for which a license key could not be acquired.

Figure 18:
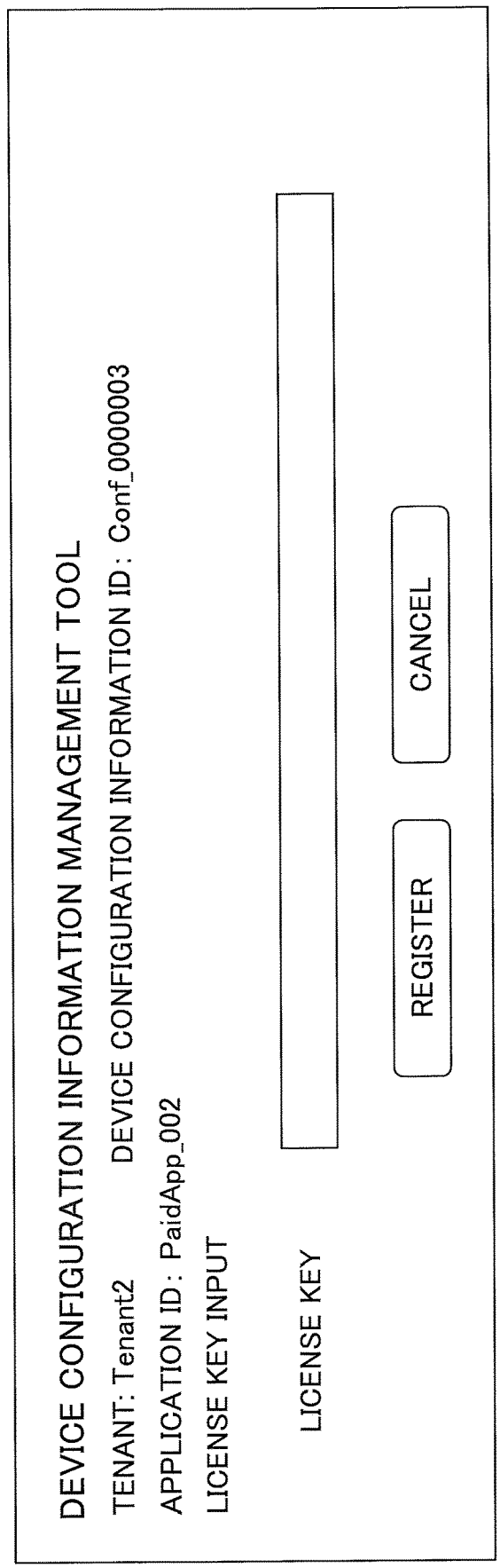
FIG. 18 is illustrates an example license key input screen.

FIG. 18 is a diagram illustrating an example license key input screen. In step S21, the operator inputs a license key for the relevant application ID to the license key input screen of FIG. 18 and presses a "REGISTER" button. By executing the processes of steps S20 and S21 when a license key for an application ID among the application IDs listed under "SELECTED APPLICATION" could not be acquired from the application information from the server apparatus 10, the application registration unit 46 can acquire the license key for the application ID by having the operator input the license key.

In step S22, the application registration unit 46 of the client apparatus 14 specifies the device configuration information ID, an application ID list, and a license key list in an application registration request for registering the selected applications, and transmits the application registration request to the device configuration management unit 23 of the server apparatus 10. The device configuration management unit 23 adds a record of application configuration information to the application configuration information table 29 of FIG. 6 based on the application registration request.

For example, when the "REGISTER" button in the application selection screen of FIG. 17 is pressed in the state where the application IDs "FreeApp_001" and "PaidApp_002" are listed under "SELECTED APPLICATION", the device configuration management unit 23 adds two records of application configuration associated with the device configuration information ID "Conf-0000003" in the application configuration information table 29 as illustrated in FIG. 6.

Note that when there is no application ID among the application IDs listed under "SELECTED APPLICATION" for which a license key could not be acquired, the application registration unit 46 can omit the processes of steps S20 and S21 and proceed to the processes of step S22. After the selected applications are registered based on the application registration request issued in step S22, the device configuration information generation unit 44 of the client apparatus 14 displays a device configuration information management screen having the application IDs of the applications registered in step S22 registered in the field for the item "APPLICATION" of the device configuration information displayed in the device configuration information management screen of FIG. 16, for example.

Figure 19:
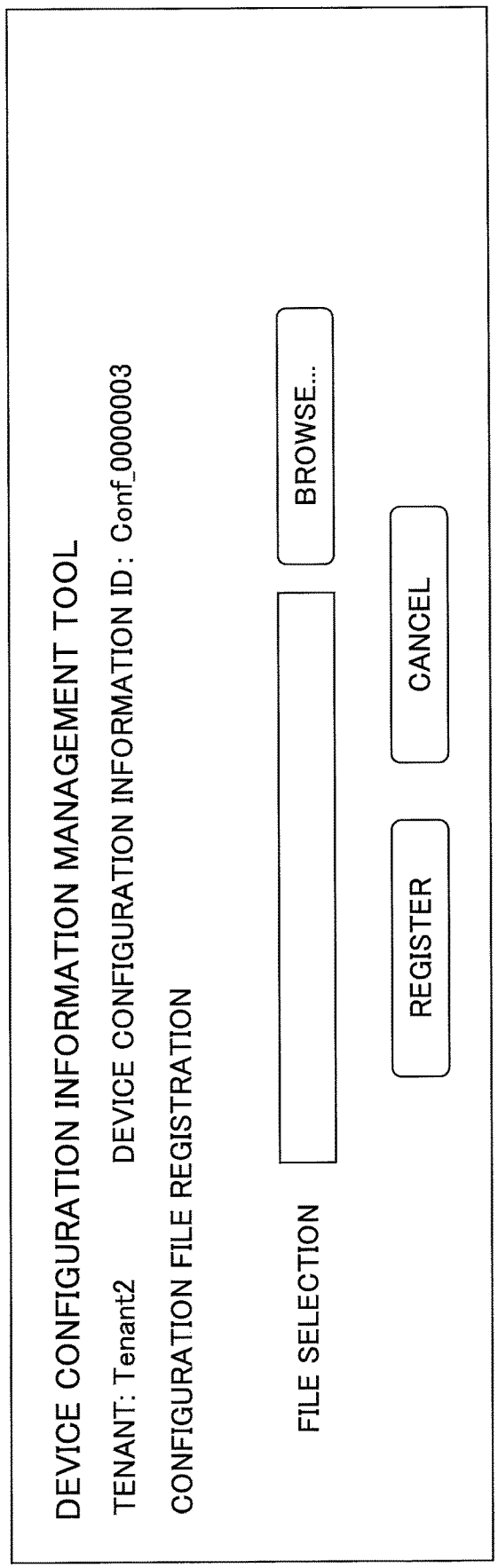
FIG. 19 illustrates an example configuration file registration screen.

Also, in step S23, the operator can cause the client apparatus 14 to display a configuration file registration screen as illustrated in FIG. 19, for example, by pressing the "REGISTER" link displayed under the item "CONFIGURATION" of the device configuration information management screen of FIG. 16. FIG. 19 is a diagram illustrating an example configuration file registration screen. When a "BROWSE" button in the configuration file registration screen is pressed, the configuration file registration unit 47 displays a file selection dialog and prompts the operator to select a file.

After a file is selected and a "REGISTER" button of the file selection screen is pressed by the operator, the process proceeds to step S24 in which the configuration file registration unit 47 uploads the configuration file selected by the operator to the device configuration management unit 23 of the server apparatus 10 and requests for registration of the selected configuration file. Then, in step S25, the device configuration management unit 23 causes the file management unit 25 to store the selected configuration file. The file management unit 25 returns a file path to the stored configuration file to the device configuration management unit 23.

The device configuration management unit 23 registers the file path received from the file management unit 25 in the field for the item "CONFIGURATION FILE" of the corresponding device configuration information stored in the device configuration information table 28 as illustrated in FIG. 5. Also, the device configuration information generation unit 44 of the client apparatus 14 receives the file path from the device configuration management unit 23 of the server apparatus 10.

The device configuration information generation unit 44 displays a "DISPLAY" link in the field for the item "CONFIGURATION" of the corresponding device configuration information displayed in the device configuration information management screen, and associates the "DISPLAY" link with the file path to the configuration file stored in the server apparatus 10. By completing the above-described process steps of the device configuration information registration operation as illustrated in FIG. 10, the device configuration information management screen of FIG. 16 may transition to a device configuration information management screen as illustrated in FIG. 20, for example. FIG. 20 is a diagram illustrating an example device configuration information management screen after application registration and configuration file registration processes have been completed.

Note that in the device configuration information registration operation illustrated in FIG. 10, a browser of the client apparatus 14 acquires the license key (e.g., for a free application) stored by the application information management unit 24 of the server apparatus 10 and executes the application registration process. However, in other examples, the device configuration management unit 23 may acquire the license key from the application information management unit 24.

Also, in the device configuration information registration operation illustrated in FIG. 10, the client apparatus 14 prompts the operator to input a license key (e.g., for a paid application) when the application information management unit 24 of the server apparatus 10 does not have a license key for an application stored therein. However, in other examples, the client apparatus 14 may be configured to cooperate with the license management unit 26 of the server apparatus 10 to issue a license key on the spot, for example.

<<Application Introduction Operation>>

Figure 21:
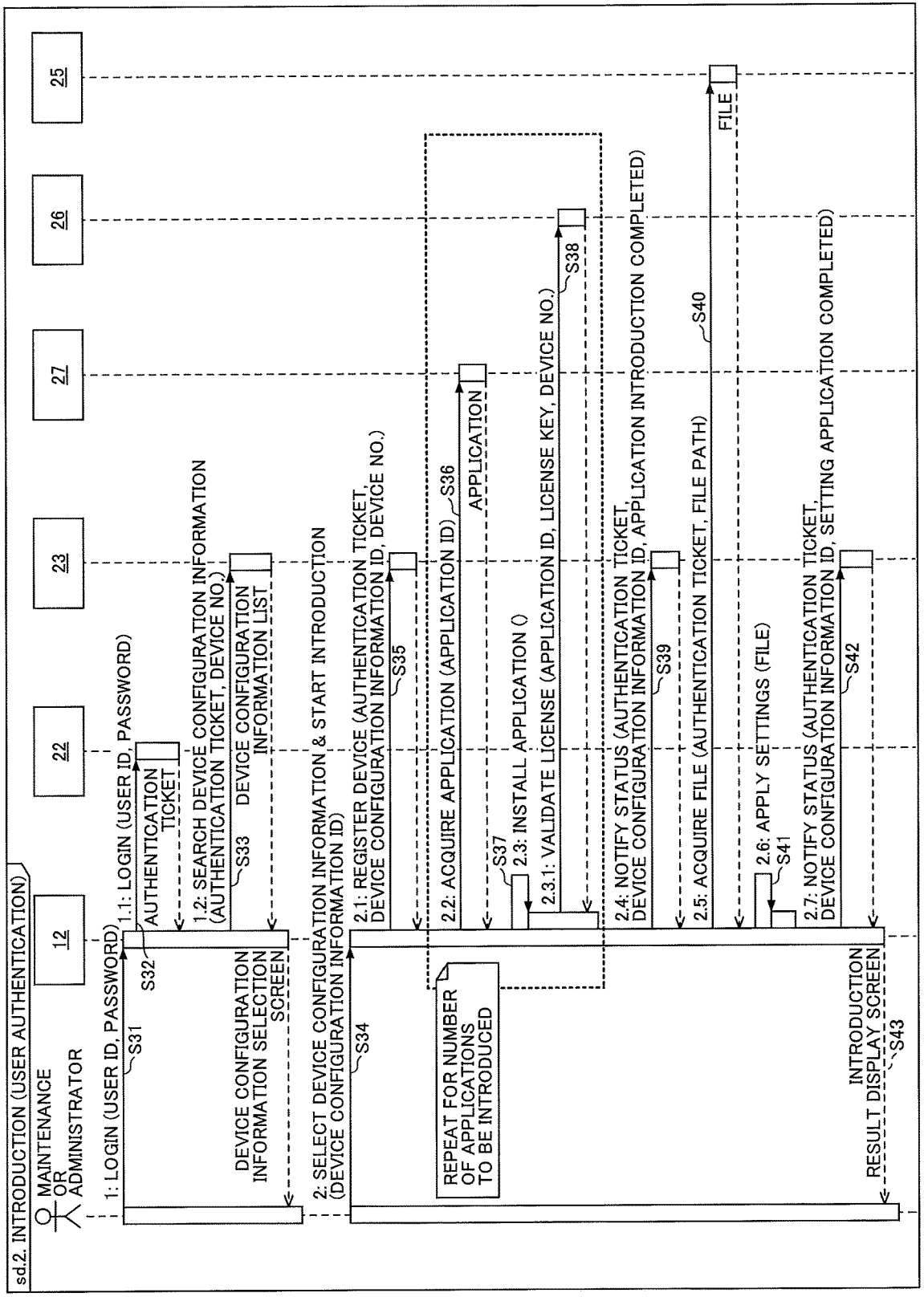
FIG. 21 is a sequence chart illustrating an example application introduction operation.

FIG. 21 is a sequence chart illustrating an example application introduction operation. The administrator may start a device configuration application by operating an operation panel of the electronic device 12 to display a login screen as illustrated in FIG. 22, for example. FIG. 22 is a diagram illustrating an example login screen of the device configuration application. The device configuration application may be a web application running on a browser or an application in the electronic device 12, for example.

In step S31, the administrator inputs a user ID and a password to the login screen of FIG. 22 for logging into the device configuration application. In step S32, the login process unit 62 of the electronic device 12 transmits a login request to the user management unit 22 of the server apparatus 10 to login using the user ID and the password input to the login screen. The user management unit 22 performs user authentication and returns an authentication ticket when the login process is successful.

For example, when an administrator inputs his/her user ID and password to the login screen to login, the login process unit 62 can identify the tenant (organization) to which the administrator belongs based on the returned authentication ticket. On the other hand, when a maintenance person inputs a user ID and a password dedicated to maintenance personnel to the login screen, the login process unit 62 will be unable to identify the tenant associated with the electronic device 12 being operated based on the returned authentication ticket. Thus, in the case where a maintenance person logs in via the electronic device 12, the maintenance person may be prompted to input the tenant ID of the relevant tenant, for example.

In step S33, the device configuration information search unit 63 requests the device configuration management unit 23 of the server apparatus 10 to search for relevant device configuration information based on the tenant ID of the relevant tenant. That is, based on the tenant ID, the device configuration management unit 23 searches the device configuration information table 28 for device configuration information associated with the tenant ID that has a status other than "COMPLETED" and does not yet have a device number registered therein. The device configuration management unit 23 returns a device configuration information list of the relevant device configuration information found by the above search to the electronic device 12.

Note that when a parameter relating to the electronic device 12 is included in parameters of the device configuration information search request, the device configuration management unit 23 searches for device configuration information associated with a device number matching the device number of the electronic device 12 registered therein. If device configuration information associated with a device number matching that of the electronic device 12 is found, the device configuration management unit 23 returns the device configuration information having the matching device number registered therein to the electronic device 12.

If no device configuration information associated with a device number matching that of the electronic device 12 is found, the device configuration management unit 23 uses the tenant ID as a search key to search the device configuration information table 28 for device configuration information having a status other than "COMPLETED" and not yet having a device number registered therein as described above. The device configuration management unit 23 then returns a device configuration information list of the relevant device configuration found by the search to the electronic device 12.

For example, when a device configuration information search is performed with respect to the device configuration information table 28 of FIG. 5 based on the tenant ID "Tenant2", a device configuration information list including the device configuration information with the device configuration information ID "Conf_0000003" may be returned to the electronic device 12.

FIGS. 23A and 23B are diagram respectively illustrating examples of a search request for device configuration information and a response to the device configuration information search request. For example, FIG. 23A illustrates an example search request for device configuration information associated with the device number "Dev_000003" and an authentication ticket "xxxxxxxxxx". FIG. 23B illustrates an example response including the device configuration information with the device configuration information ID "Conf_0000003" indicated in FIG. 5 and the application configuration information associated with the device configuration information ID "Conf_0000003" indicated in FIG. 6.

The device registration unit 64 of the electronic device 12 that receives the device configuration information list may display a device configuration information selection screen as illustrated in FIG. 24, for example. FIG. 24 is a diagram illustrating an example device configuration information selection screen. Note that the device configuration information selection screen of FIG. 24 is an example device configuration information selection screen generated based on the response illustrated in FIG. 23B.

Also, when a device configuration information search is performed with respect to the device configuration information table 28 of FIG. 5 based on the tenant ID "Tenant3", a device configuration information list including device configuration information with the device configuration information IDs "Conf_0000004" and "Conf_0000005" is returned to the electronic device 12. FIG. 25 is a diagram illustrating an example response including a plurality of records of device configuration information.

For example, FIG. 25 illustrates an example response including the device configuration information with the device configuration information IDs "Conf_0000004" and "Conf_0000005" indicated in FIG. 5 and the application configuration information associated with the device configuration information IDs "Conf_0000004" and "Conf_0000005" in FIG. 6.

In this case, the device registration unit 64 of the electronic device 12 that receives the device configuration information list may display a device configuration information selection screen as illustrated in FIG. 26, for example. FIG. 26 is a diagram illustrating an example device configuration information selection screen. Note that the device configuration information selection screen of FIG. 26 is an example device configuration information selection screen generated based on the response illustrated in FIG. 25.

When the device configuration information list returned from the server apparatus 10 is empty, this means that there is no device configuration information requiring introduction of an application associated with the device configuration application of the electronic device 12, and as such, the application introduction process of FIG. 21 is terminated. For example, in the device configuration information table 28 of FIG. 5, the application introduction status of each record of device configuration information associated with the tenant ID "Tenant 1" is indicated as "COMPLETED" and there is no device configuration information requiring introduction of an application.

In step S34, the administrator operating the electronic device 12 can select device configuration information and start an application introduction process by pressing an "INTRODUCE" button displayed in the device configuration information selection screen of FIG. 24 or FIG. 26, for example. Note that when the device configuration information can be uniquely identified without a selection operation as in the device configuration information selection screen of FIG. 24, the application introduction process may be automatically started without displaying the "INTRODUCE" button, for example.

Also, even in a case where a plurality of records of device configuration information are registered, the application introduction process may be automatically started without displaying the "INTRODUCE" button if the device configuration information all have the same content, such as the same description, configuration file, and application configuration, for example. A typical example of such a case is when a plurality of electronic devices 12 to be used for the same purpose are delivered in a batch.

As the number of the electronic devices 12 to be delivered increases, the device configuration registration operations to be performed by the operator of the client apparatus 14 may be quite burdensome and it may be desirable to register the electronic devices 12 in a batch in order to reduce the processing load. For example, the device configuration information generation unit 44 may enable the new device configuration information generation screen of FIG. 15 to accept inputs for a plurality of electronic devices 12. Also, the device configuration information management unit 23 of the server apparatus 10 may generate and add records of device configuration information for a plurality of electronic devices to the device configuration information table 28.

The license key input screen of FIG. 18 may be configured to prompt input of a volume license key for a plurality of electronic devices 12, and after the license management unit 26 verifies the volume license key, the volume license key may be registered in association with a plurality of records of device configuration information, for example.

After the application introduction process is started, if a device number is not registered in the device configuration information selected by the administrator, the process proceeds to step S35 where the device registration unit 64 of the electronic device 12 transmits a registration request for registering the electronic device 12 to the device configuration management unit 23 of the server apparatus 10. Specifically, in the electronic device registration request issued in step S35, the device registration unit 64 specifies the device number of the electronic device 12 and the device configuration information ID of the device configuration information in which the device number is to be registered and requests the device configuration management unit 23 to register the device number in the specified device configuration information. Also, the device configuration management unit 23 updates the status of the specified device configuration information to "INTRODUCING APPLICATION".

For example, the record of device configuration information associated with the tenant ID "Tenant2" in the device configuration information table of FIG. 5 may have its status updated from "NOT REGISTERED" to "INTRODUCING APPLICATION" as illustrated in FIG. 27. FIG. 27 is a diagram illustrating an example of device configuration information while an application is being introduced to the corresponding electronic device 12.

Then, the application introduction process unit 65 of the electronic device 12 repeatedly performs the processes of steps S36 to S38 a number of times equal to the number of applications to be introduced to the electronic device 12.

In step S36, the application introduction process unit 65 specifies an application ID associated with the device configuration information selected in step S34, and acquires an application execution file from the application storage unit 27 of the server apparatus 10. Then, in step S37, the application introduction process unit 65 installs the application identified by the application ID based on the acquired execution file.

Then, the process proceeds to step S38 where the application introduction process unit 65 specifies the application ID, the license key, and the device number associated with the device configuration information selected in step S34 and requests the license management unit 26 of the server apparatus 10 to validate the license. After execution of the processes of steps S36 to S38 are completed, the status notification unit 67 of the electronic device 12 notifies the device configuration management unit 23 of the server apparatus 10 that the application introduction status has transitioned to "APPLICATION INSTALLATION COMPLETED". The device configuration management unit 23 updates the application introduction status of the specified device configuration information to "APPLICATION INTRODUCTION COMPLETED".

Then, the process proceeds to step S40 where the setting application unit 66 specifies the file path to the configuration file of the device configuration information selected by the administrator in step S34 and acquires the configuration file from the file management unit 25 of the server apparatus 10. Then, the process proceeds to step S41 where the setting application unit 66 applies the settings of the acquired configuration file. The configuration file may include the settings of the installed application. Accordingly, the process of applying the settings of the configuration file in step S41 is performed after the installing the application in step S37.

Then, the process proceeds to step S42 where the status notification unit 67 of the electronic device 12 notifies the device configuration management unit 23 of the server apparatus 10 that the application status has transitioned to "SETTING APPLICATION COMPLETED". The device configuration management unit 23 updates the application introduction status of the specified device configuration information to "SETTING APPLICATION COMPLETED". Then, in step S43, the electronic device 12 displays an introduction result display screen on the operation panel of the electronic device 12 in step S43 and ends the application introduction operation.

In the operation scenario of FIG. 9, the operator of the client apparatus 14 associates device configuration information with a corresponding tenant in advance and uses the device configuration information to introduce one or more applications to the electronic device 12. However, there may be other operation scenarios such as that illustrated in FIG. 28, for example.

Figure 28:
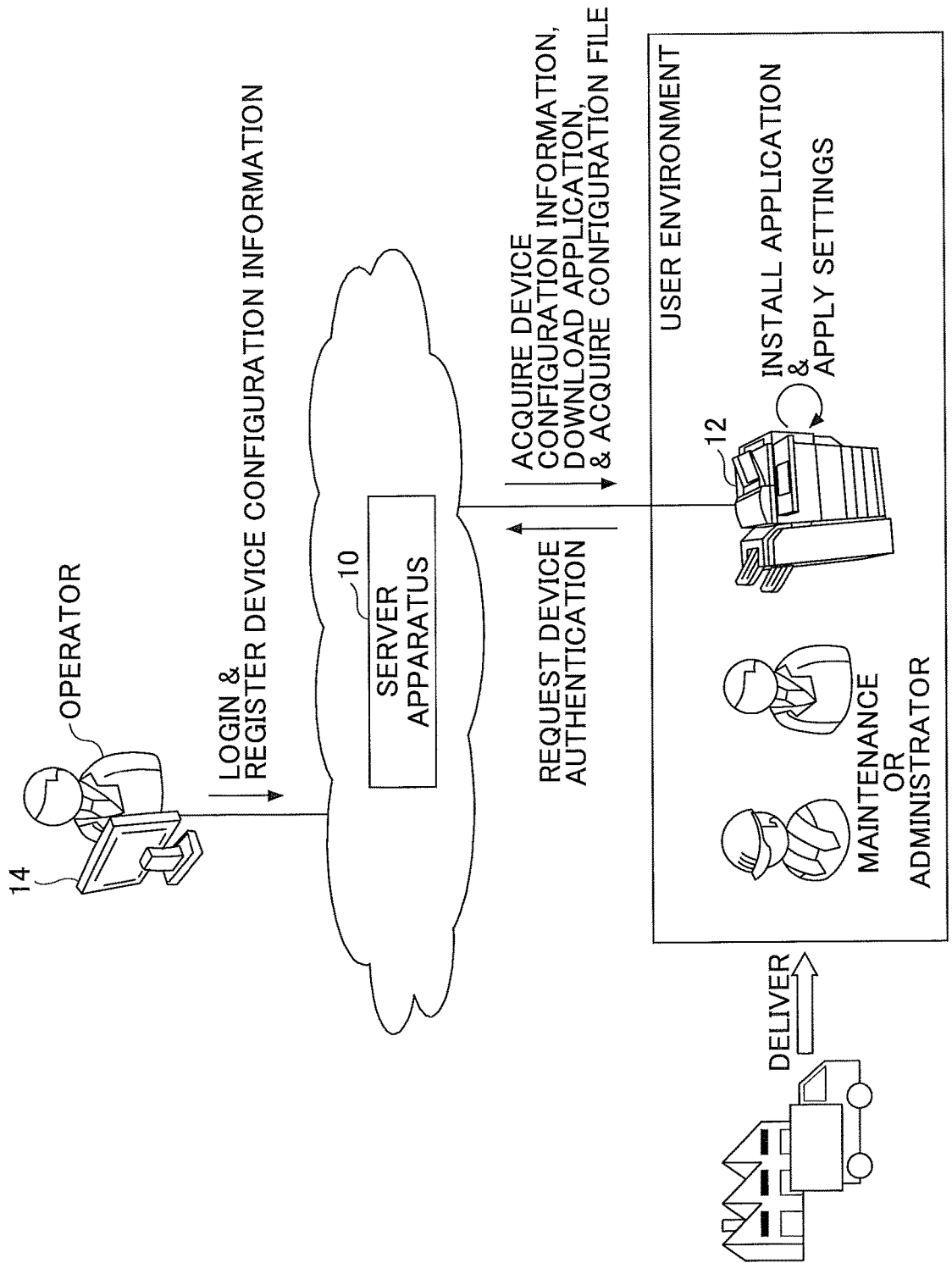
FIG. 28 is a diagram illustrating another example operation scenario for introducing an application to an electronic device using device configuration information.

FIG. 28 is a diagram illustrating another example operation scenario for introducing an application to the electronic device 12 using device configuration information. The operator of the client apparatus 14 logs into the server apparatus 10 and registers device configuration information in the server apparatus 10 in association with a corresponding device number. That is, in the operation scenario of FIG. 28, the operator registers device configuration information in association with a corresponding device number in the server apparatus 10 as a preliminary operation.

After the electronic device 12 is delivered to the user environment, an administrator (or a maintenance person) performs application introduction operations. The administrator operates the electronic device 12 to open an introduction screen. The electronic device 12 requests the server apparatus 10 to perform device authentication. When the device authentication is successful, the electronic device 12 specifies its device number and acquires device configuration information associated with the specified device number from the server apparatus 10.

Based on the acquired device configuration information, the electronic device 12 downloads one or more applications registered in the device configuration information from the server apparatus 10 to install the applications. Further, the electronic device 12 acquires a configuration file from the server apparatus 10 based on the acquired device configuration information and reflects the settings included in the acquired configuration file.

In the following, a device configuration information registration operation performed in advance by the operator of the client apparatus 14 and an application introduction operation performed by the administrator operating the electronic device 12 in the operation scenario of FIG. 28 are described.

<<Device Configuration Information Registration Operation>>

Note that a majority of process steps of the device configuration information registration operation performed in the operation scenario of FIG. 28 may be substantially identical to the process steps of FIG. 10 illustrating the device configuration information registration operation performed in the operation scenario of FIG. 9. As such, the device configuration information registration operation performed in the operation scenario of FIG. 28 is described below with reference to FIG. 10 while pointing out process operations that differ from those performed in the operation scenario of FIG. 9. In the operation scenario of FIG. 28, the process of selecting a tenant in step S13 may be omitted. In the case where the process of selecting a tenant in step S13 is omitted, the device configuration information management screen of FIG. 13 may display all the device configuration information records that can be viewed by the operator, for example.

Also, when the "NEW" link displayed in the device configuration information management screen of FIG. 13 or FIG. 14 is pressed, a new device configuration information generation screen as illustrated in FIG. 29 may be displayed, for example. FIG. 29 is a diagram illustrating an example new device configuration information generation screen that may be displayed in the operation scenario of FIG. 28. To generate new device configuration information in the present operation scenario, in step S15, the operator inputs a device number and a description in the new device configuration information generation screen of FIG. 29 and presses the "CREATE" button.

In turn, the device configuration information creation unit 44 specifies the device number and description input to the new device configuration information generation screen and requests the device configuration management unit 23 of the server apparatus 10 to generate device configuration information. The device configuration management unit 23 of the server apparatus 10 generates and adds the device configuration information having the specified device number and description registered therein to the device configuration information table 28.

As described above, in the operation scenario of FIG. 28, each record of device configuration information stored in the device configuration information table 28 has a corresponding device number registered therein from the time the device configuration information is generated. Note that other process steps of the device configuration information registration operation may be substantially the same as those performed in the operation scenario of FIG. 9, and as such, descriptions thereof will be omitted.

Figure 30:
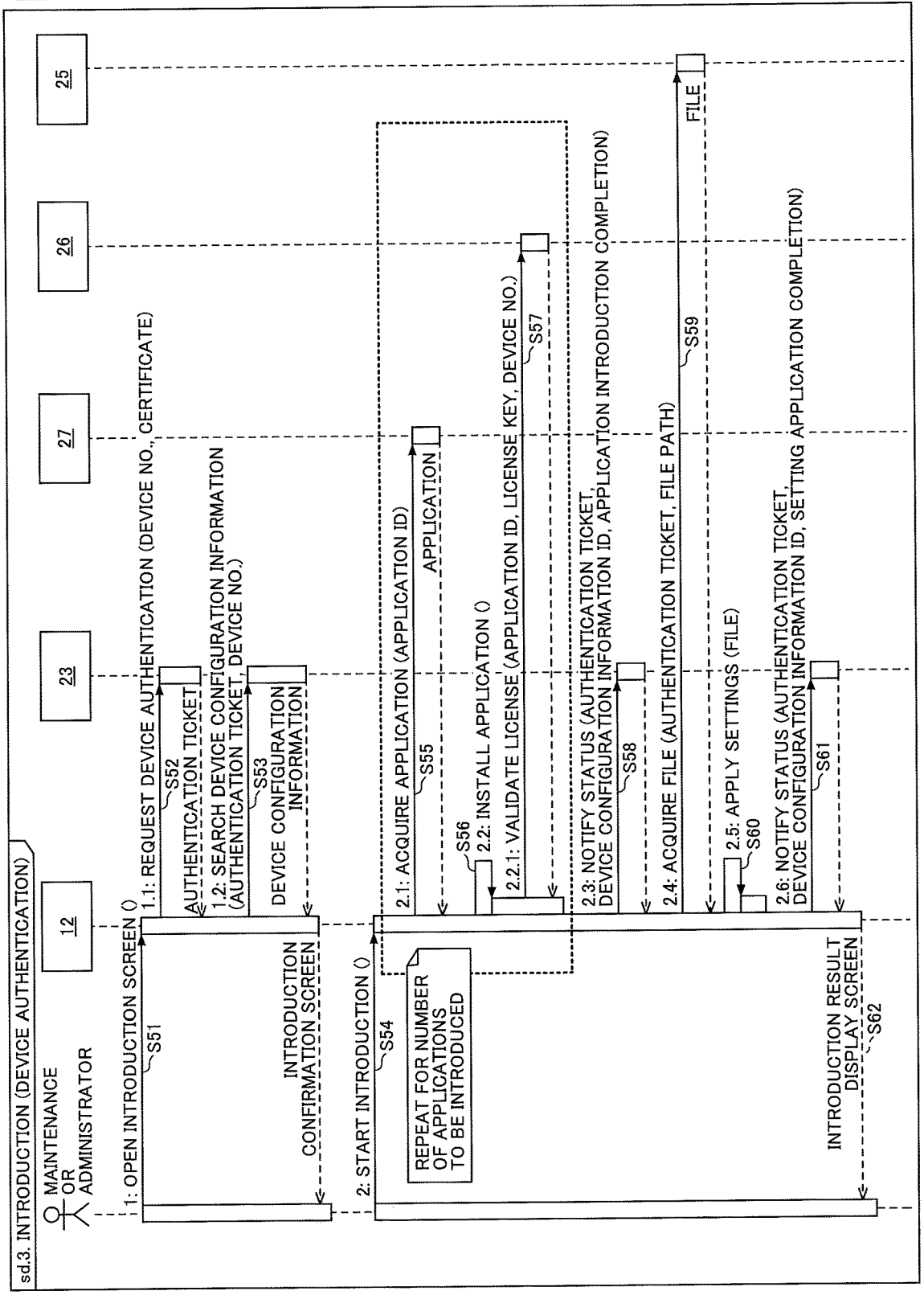
FIG. 30 is a sequence chart illustrating another example application introduction operation.

FIG. 30 is a sequence chart illustrating an example application introduction operation performed in the operation scenario of FIG. 28. In FIG. 30, device authentication for authenticating the electronic device 12 is performed instead of performing user authentication of the administrator (or maintenance person) operating the electronic device 12 through a login process. The device authentication is performed between the device configuration application running on the electronic device 12 and the device configuration management unit 23 of the server apparatus 10, and as such, the administrator does not have to input any information.

For example, in a case where a digital certificate for identifying each individual device is stored in a storage unit of the electronic device 12 that is shipped and delivered to the user environment, device authentication may be performed by implementing SSL/TLS client authentication using this digital certificate.

In step S51, the administrator opens an introduction screen, and in step S52, the electronic device 12 performs device authentication. If the device authentication is successful, the process proceeds to step S53 where the electronic device 12 specifies its device number and requests the device configuration management unit 23 of the server apparatus 10 to search for relevant device configuration information based on the specified device number. The device configuration management unit 23 searches the device configuration information table 28 for device configuration information having a device number matching the specified device number and a status other than "COMPLETED" registered therein, and returns a result of the search to the electronic device 12. Note that the device configuration management unit 23 may return one record of relevant device configuration information or no relevant device configuration information to the electronic device 12. If no relevant device configuration information is returned to the electronic device 12, the device configuration application ends the present process. If relevant device configuration information is returned, the electronic device 12 displays an introduction confirmation screen and performs processes of step S54 and subsequent process steps with respect to the relevant device configuration information returned by the server apparatus 10. Note that because device configuration information can be uniquely identified by a device number, the application introduction process may be automatically started without displaying the "INTRODUCE" button in the device configuration information selection screen of FIG. 24 or FIG. 26, for example. Also, because the device number is registered from the beginning, the process of registering the electronic device 12 in step S35 of FIG. 21 may be omitted.

Figure 31:
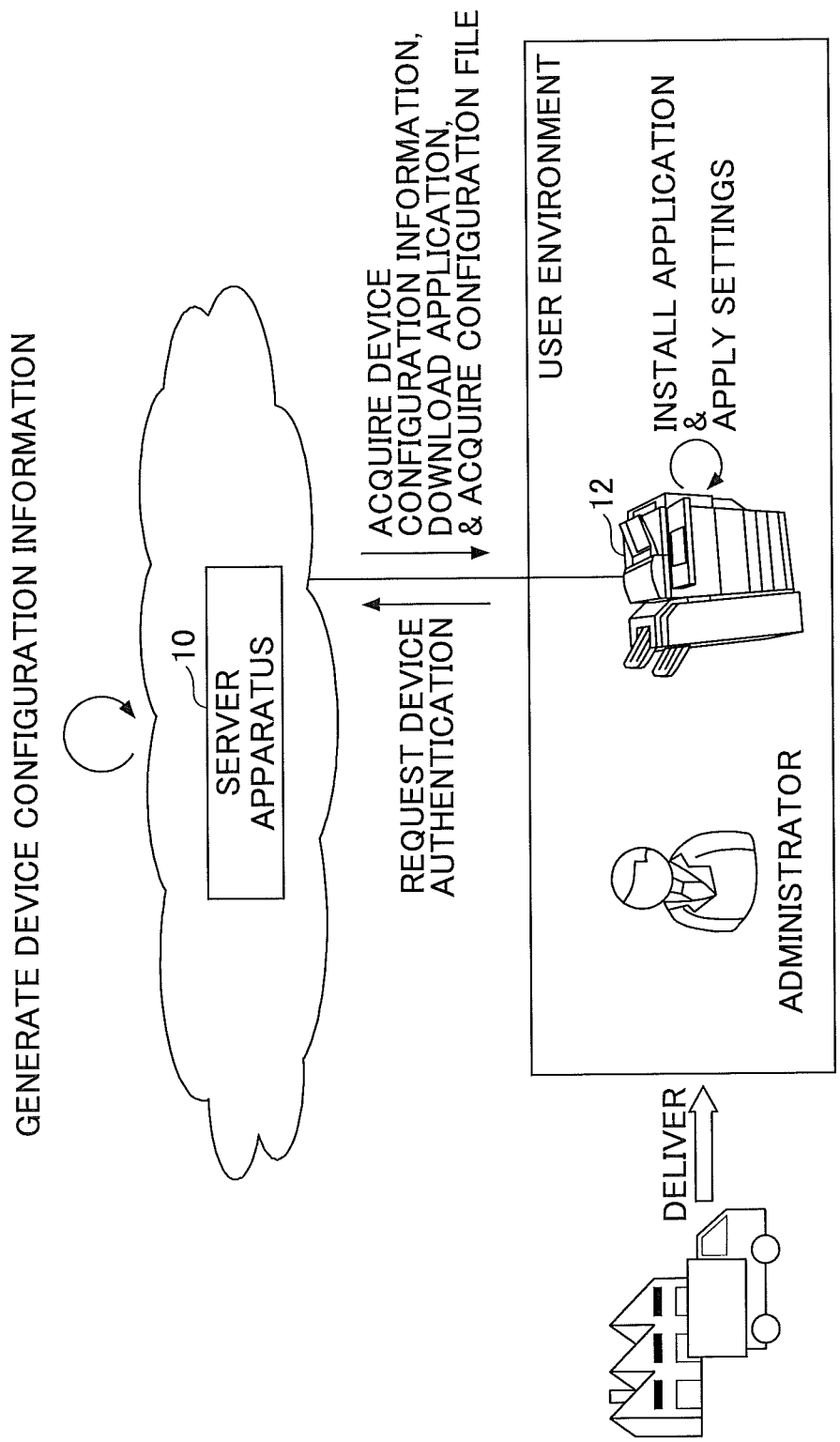
FIG. 31 is a diagram illustrating an example operation scenario for introducing an application to an electronic device using automatically generated device configuration information.

In the operation scenarios of FIG. 9 and FIG. 28, the operator registers device configuration information in advance as a preliminary operation via the client apparatus 14 thereby raising operation costs. On the other hand, operational costs are desirably minimized for free applications and trials of paid applications, for example. FIG. 31 illustrates an example operation scenario for automatically generating device configuration information. Note that in the present operation scenario, it is assumed that each record of device configuration information is associated with a corresponding device number from the beginning as described above with reference to FIG. 28. However, processes for automatically generating device configuration information may also be performed in an operation scenario where each record of device configuration information is associated with a corresponding tenant as described above with reference to FIG. 9, for example.

In FIG. 31, device configuration information that has been automatically generated is used to introduce an application to the electronic device 12. An administrator (or a maintenance person) performs an application introduction process after the electronic device 12 is delivered to the user environment. The administrator operates the electronic device 12 to open an introduction screen. In turn, the electronic device 12 requests the server apparatus 10 to perform device authentication.

If the device authentication is successful, the electronic device 12 specifies its device number and requests the server apparatus 10 to acquire device configuration information registered in association with the specified device number. When no device configuration information is returned, the electronic device 12 requests the server apparatus 10 to generate new device configuration information. In turn, the server apparatus 10 generates new device configuration information and returns the generated device configuration information to the electronic device 12.

Based on the acquired device configuration information, the electronic device 12 downloads an application from the server apparatus 10 and installs the application. Further, the electronic device 12 acquires a configuration file from the server apparatus 10 based on the acquired device configuration information, and applies the settings specified in the acquired configuration file.

Figure 32:
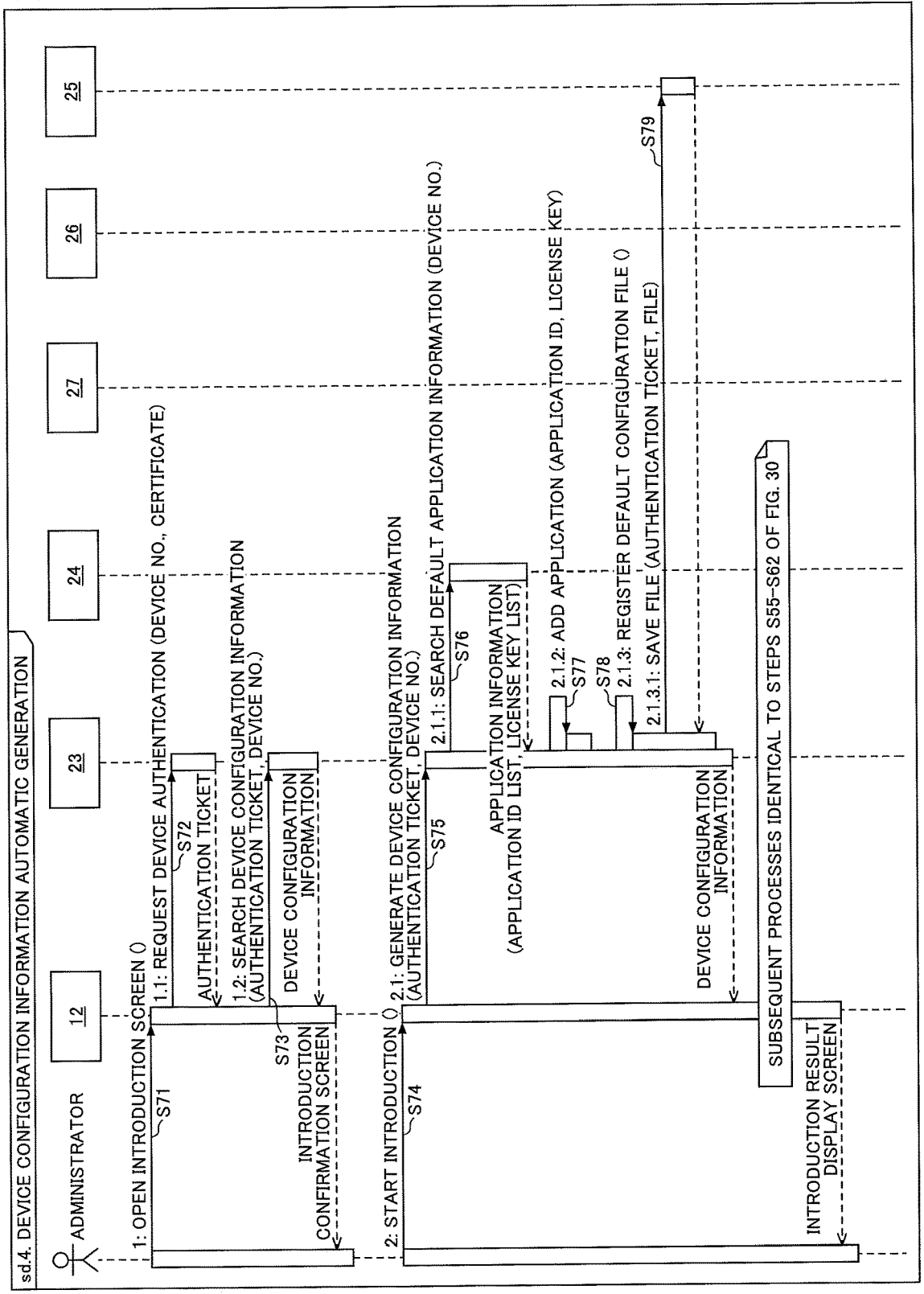
FIG. 32 is a sequence chart illustrating another example application introduction operation.

In the following, the application introduction operation performed by the administrator operating the electronic device 12 in the operation scenario of FIG. 31 is described. FIG. 32 is a sequence chart illustrating an example application introduction operation performed in a case where device configuration information is automatically generated. Note that some process steps of the application introduction operation performed in FIG. 32 may be substantially the same as the process steps of FIG. 30, and as such, descriptions thereof may be omitted as appropriate.

The processes of steps S71 to S72 may be substantially the same as the processes of steps S51 to S52 of FIG. 30. If the device authentication is successful, the process proceeds to step S73 where the electronic device 12 specifies its device number and requests the device configuration management unit 23 of the server apparatus 10 to search for relevant device configuration information based on the specified device number. The device configuration management unit 23 searches the device configuration information table 28 for device configuration information having a device numbers matching the specified device number and a status other than "COMPLETED" registered therein, and returns a result of such search to the electronic device 12. Note that in the operation scenario of FIG. 31, the device configuration management unit 23 also searches the device configuration information table 28 for device configuration information having a device number matching the specified device number and the status "COMPLETED" registered therein, and returns a result of such a search to the electronic device 12. In this way, the electronic device 12 may be able to distinguish between a case where device configuration information associated with the specified device number does not exist and a case where such device configuration information has the status "COMPLETED" registered therein.

If device configuration information having a device number matching the specified device number and the status "COMPLETED" registered therein is returned to the electronic device 12, the device configuration application ends the present process. If device configuration information having a device number matching the specified device number and a status other than "COMPLETED" registered therein is returned to the electronic device 12, the device configuration application may execute an application introduction process similar to that implemented in the operation scenario of FIG. 28.

If no device configuration information is returned, in step S74, the electronic device 12 may confirm introduction of a free application via an introduction confirmation screen, for example, and upon receiving an instruction to start the application introduction process, the electronic device 12 may execute the process of step S75. In step S75, the electronic device 12 requests the device configuration management unit 23 of the server apparatus 10 to generate new device configuration information.

In step S76, the device configuration management unit 23 requests the application information management unit 24 to search for default application information. The application information management unit 24 returns default application information relating to one or more applications (e.g., recommended applications) to be introduced. In step S77, the device configuration management unit 23 adds the default application information to the application configuration information table 29.

In step S78, the device configuration management unit 23 registers a default configuration file in the device configuration information. The default configuration file may include print mode settings (e.g., color mode, such as monochrome or full color, and combine setting such as 2 in 1), for example.

The default configuration file of the electronic device 12 is registered and stored in the device configuration management unit 23. In step S79, the device configuration management unit 23 registers the default configuration file in the file management unit 25.

The device configuration management unit 23 returns the device configuration information automatically generated in the above-described manner to the electronic device 12. The subsequent processes may be substantially the same as the processes of steps S55 and onward of FIG. 30. Note that the default application information is preferably arranged to be variable depending on a region or a vendor company, for example. Note that in some embodiments, a default configuration file including default settings for the application may be retained by the application information management unit 24 instead of the device configuration management unit 23, for example.

In this case, a configuration file may be generated by merging the default configuration file of the electronic device 12 retained by the device configuration management unit 23 and the default configuration file of the application (to be installed) retained by the application information management unit 24, for example.

According to an aspect of the first embodiment of the present invention, operations for introducing an application and applying settings of a configuration file to the electronic device 12 may be easily performed after the electronic device 12 has been delivered to the user environment.

Second Embodiment

Note that when replacing an existing electronic device 12 with a new electronic device 12 or adding a new electronic device 12, the new electronic device 12 may be required to be in the same state as the already existing electronic device 12. A second embodiment of the present invention relates to an operation scenario in which the same application that is installed in an existing electronic device 12 is introduced to a new electronic device 12.

<<Introduction of Application to Replacement/Additional Electronic Device>>

Figure 33:
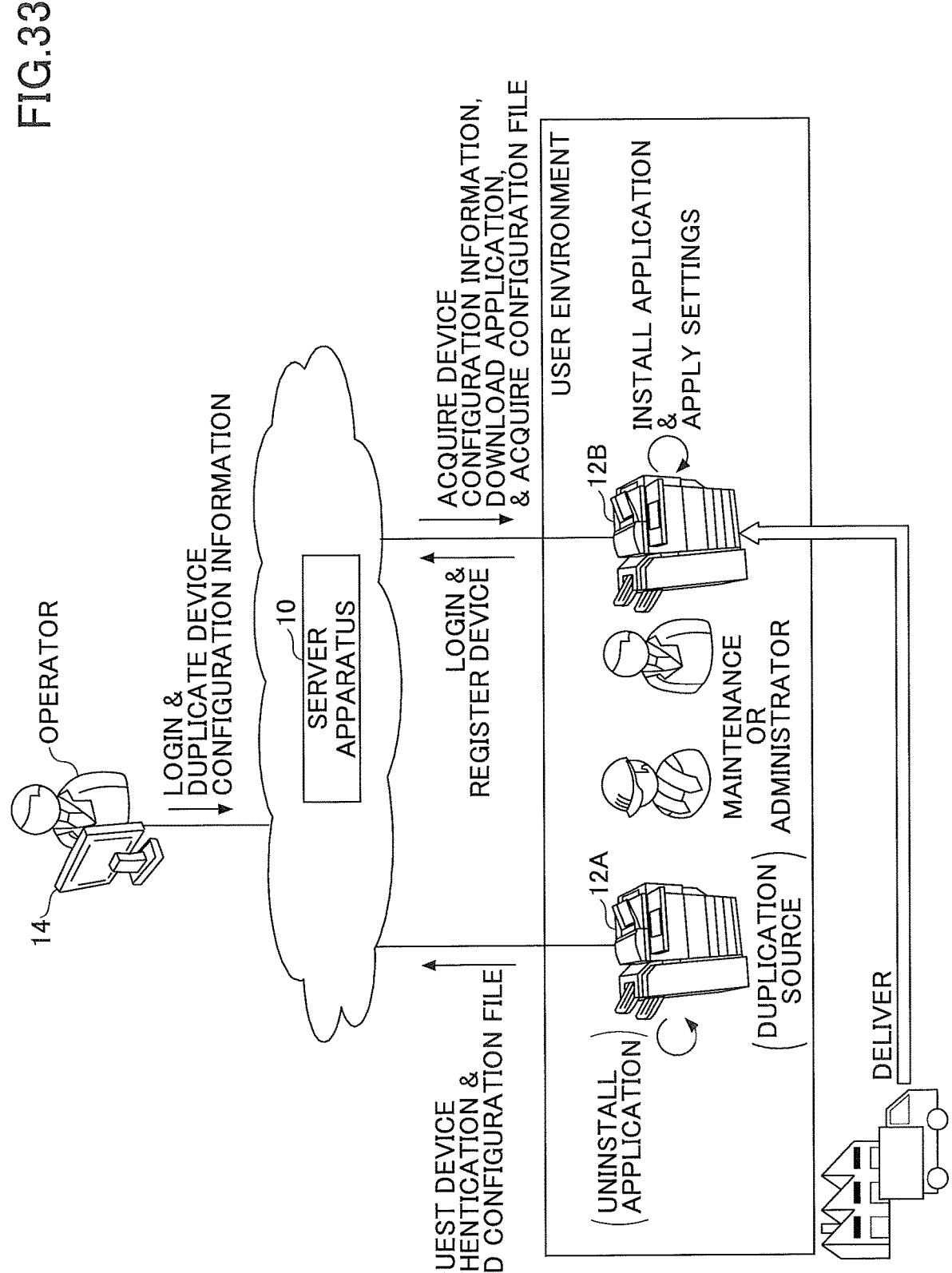
FIG. 33 is a diagram illustrating an example operation scenario for introducing an application to an electronic device that is provided as a replacement or an addition using device configuration information.

In the present embodiment, an application is introduced to an electronic device 12B that is provided as a replacement or an addition to an existing electronic device 12A as illustrated in FIG. 33, for example. FIG. 33 is a diagram illustrating an example operation scenario in which device configuration information is used in introducing an application to the electronic device 12B.

In FIG. 33, the existing electronic device 12A as a device configuration information duplication source and the electronic device 12B provided as a replacement or an addition (duplication destination) are indicted in the user environment.

Replacement of the electronic device 12A with the electronic device 12B may be performed, for example, when operations of the electronic device 12A with the device number "Dev_000003" used by the tenant with the tenant ID "Tenant 2" becomes unstable. Also, addition of the electronic device 12B may be performed to improve operation efficiency, for example. Note that in the above-described operation scenario of introducing the same application to the electronic device 12B, the device configuration information associated with the tenant ID "Tenant 2" in the device configuration information table 28 of the server apparatus 10 may be updated from the state as illustrated in FIG. 5 to the state as illustrated in FIG. 34, for example. FIG. 34 is a diagram illustrating an example of device configuration information for which an application introduction process has been completed.

The operator logs into the server apparatus 10 via the client apparatus 14 and duplicates the device configuration information of the duplication source electronic device 12A as a preliminary operation. The duplicated device configuration information is registered in the server apparatus 10 in association with the tenant ID "Tenant 2".

After the duplication destination electronic device 12B is delivered to the user environment, the administrator operates the duplication source electronic device 12A to perform a data transfer operation (device configuration information duplication operation) at the duplication source electronic device 12A, and operates the duplication destination electronic device 12B to perform an application introduction operation at the duplication destination electronic device 12B as described below.

<<Device Configuration Information Duplication Operation>>

Figure 35:
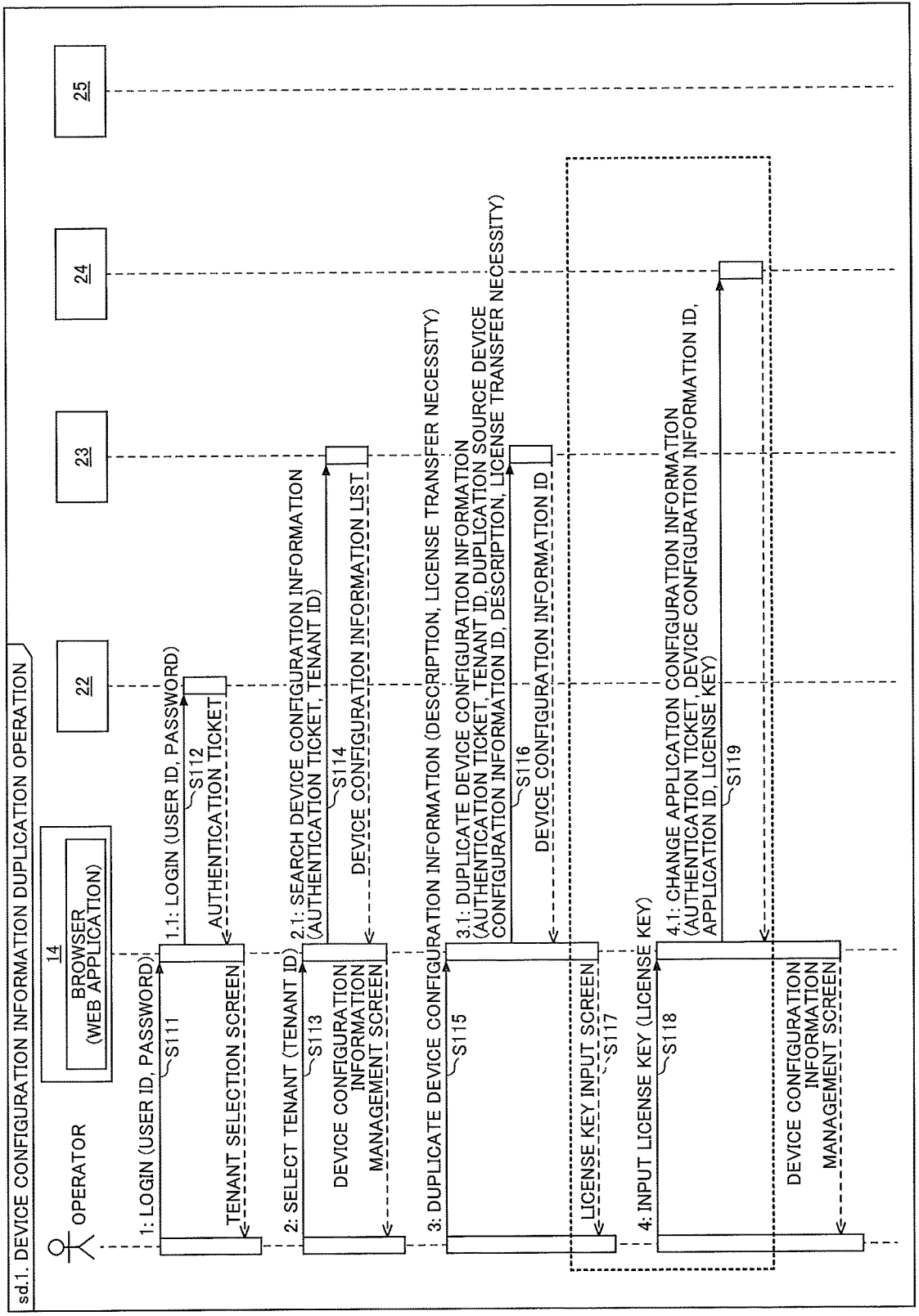
FIG. 35 is a sequence chart illustrating an example device configuration information duplication operation.

FIG. 35 is a sequence chart illustrating an example device configuration information duplication operation for duplicating device configuration information.

In steps S111 to S112, the operator accesses a device configuration information management tool via the browser running on the client apparatus 14, logs into the server apparatus 10 via the login screen of FIG. 11, and causes the client apparatus 14 to display the tenant selection screen of FIG. 12, for example.

In steps S113 to S114, the operator inputs a tenant ID into the tenant selection screen of FIG. 12 and presses the "OPEN" button to display a device configuration information management screen as illustrated in FIG. 36, for example. FIG. 36 is a diagram illustrating an example device configuration information management screen. Note that the device configuration information management screen of FIG. 36 is an example device configuration information management screen generated based on the device configuration information illustrated in FIG. 34.

When a "DUPLICATE" button displayed in the device configuration information management screen of FIG. 36 is pressed, the device configuration information duplication process unit 48 of the client apparatus 14 displays a device configuration information duplication screen as illustrated in FIG. 37, for example. FIG. 37 is a diagram illustrating an example device configuration information duplication screen. The device configuration information duplication screen of FIG. 37 indicates the device configuration information ID of the device configuration information for the duplication source electronic device 12A, the device number of the duplication source electronic device 12A, a description of the device configuration information to be duplicated, and a check box for license transfer. The device configuration information duplication screen of FIG. 37 also displays a "DUPLICATE" button and a "CANCEL" button.

For example, when replacing the electronic device 12A with the electronic device 12B, the license of the electronic device 12A has to be transferred to the electronic device 12B corresponding to the duplication destination. Therefore, when replacing the electronic device 12A, the operator checks off the checkbox "LICENSE TRANSFER". Also, in the description of the device configuration information to be duplicated, the electronic device 12A is identified as the duplication source of the device configuration information (e.g., "DUPLICATE FROM 1F (Dev_000003"). Note that the description of the device configuration information to be duplicated may be changed by the operator, for example.

Also, when adding a plurality of electronic devices 12B based on the electronic device 12A, an input field for inputting the number of device units may be displayed on the device configuration information duplication screen of FIG. 37 in order to simplify the operations to be performed by the operator. In this way, device configuration information for the plurality of electronic devices 12B may be duplicated all at once.

When the "DUPLICATE" button on the device configuration information duplication screen of FIG. 37 is pressed, the device configuration information duplication process unit 48 specifies the tenant ID, the duplication source device configuration information ID, the description, and whether license transfer is necessary in a device configuration information duplication request, and transmits the device configuration information duplication request to the server apparatus 10.

Upon receiving the device configuration information duplication request from the client apparatus 14, the device configuration management unit 23 of the server apparatus 10 checks whether license transfer is necessary. If license transfer is not necessary, device configuration management unit 23 adds (duplicates) records of device configuration information and application configuration information to the device configuration information table 28 and the application configuration information table 29.

FIG. 38 illustrates an example device configuration information table having a record of device configuration information added thereto in a case where license transfer is not necessary. In the device configuration information table of FIG. 38, the record at the top corresponds to device configuration information of the duplication source, and the record at the bottom corresponds to device configuration information of the duplication destination. Note that "EXPORTING" is indicated under the item "CONFIGURATION FILE" for the duplication source device configuration information. That is, the configuration file registered in association with the duplication source device configuration information is once deleted because the configuration file may not necessarily be the latest version, for example. Then, the latest configuration file exported from the duplication source electronic device 12A is subsequently imported to the duplication destination device configuration. Note that at this stage, data indicating that a configuration file is to be duplicated from the duplication source device configuration information (e.g., "DUPLICATE FROM Conf_0000003") is stored under the item "CONFIGURATION FILE" for the duplication destination device configuration information.

FIG. 39 illustrates an example application configuration information table having records of application configuration information added thereto in a case where license transfer is not necessary. In the application configuration information table illustrated in FIG. 39, the bottom two records correspond to the added records of application configuration information. The application with the application ID "FreeApp_001" is an example of a free application, and as such, the license key of the application is duplicated from the duplication source application configuration information. Note that whether the license key can be duplicated may be determined by inquiring the license management unit 26, for example.

A license for an application may be arranged to include an attribute indicating whether the application is free or paid, or the license may have a limit to the number of electronic devices 12 that can use the application, for example. In a case where the license key can be freely duplicated, the license may indicate that the number of electronic devices that can use the application is unlimited, for example.

The application with the application ID "PaidApp_002" is an example of a paid application, and as such, a new license key has to be input. Thus, in the application configuration information table illustrated in FIG. 39, the item "LICENSE KEY" for the application configuration information for the application "PaidApp_002" is left blank.

The device configuration management unit 23 of the server apparatus 10 returns the device configuration information ID of the duplicated device configuration information to the client apparatus 14. Upon receiving the device configuration information ID of the duplicated device configuration information from the server apparatus 10, the device configuration information duplication process unit 48 of the client apparatus 14 proceeds to step S117 to display a license key input screen as illustrated in FIG. 18, for example, with respect to the application configuration information with the item "LICENSE KEY" left blank, for example.

In step S118, the operator inputs a license key to the license key input screen of FIG. 18 and presses the "REGISTER" button. Then, in step S119, the application registration unit 46 of the client apparatus 14 specified the device configuration information ID, the application ID, and the license key, and requests the device configuration management unit 23 of the server apparatus 10 to change the application configuration information. Based on the application configuration information change request, the device configuration management unit 23 adds the license key "Lic_002_000003" to the record of application configuration information associated with the application ID "PaidApp_002" in the application configuration information table 29 of FIG. 39, for example. As a result the corresponding record of application configuration information may be updated as illustrated in FIG. 40, for example.

After making the application configuration information change request in step S119, the device configuration information duplication process unit 48 of the client apparatus 14 may display a device configuration information management screen as illustrated in FIG. 41, for example. FIG. 41 is a diagram illustrating an example device configuration information management screen displayed by the client apparatus 14 when device configuration information is duplicated. Note that the device configuration information duplication process unit 48 of the client apparatus 14 may be configured to be capable of further adding an application to the duplicated device configuration information displayed in the device configuration information management screen of FIG. 41, for example.

Also, when device configuration information duplicated for a plurality of electronic devices at once, a license key may have to be registered for each record of application configuration information associated with each record of device configuration information. Note that when the license key is a volume license, the same license key may be simultaneously registered for a plurality of records of application configuration information associated with a plurality of records of device configuration information, for example.

Also, when the device configuration management unit 23 of the server apparatus 10 receives a device configuration information duplication request from the client apparatus 14 and the duplication request indicates that a license transfer is necessary, the device configuration management unit 23 similarly adds (duplicates) records of device configuration information and application configuration information to the device configuration information table 28 and the application configuration information table 29. The record added to the device configuration information table 28 may be the same as the record added in the case where license transfer is unnecessary as illustrated in FIG. 38, for example.

FIG. 42 illustrates an example application configuration information table having records added therein in the case where license transfer is necessary. Note that the record for the free application with the application ID "FreeApp_001" is the same as the record added in the case where license transfer is not necessary as illustrated in FIG. 39.

On the other hand, with respect to the paid application with the application ID "PaidApp_002", "INVALIDATING" is indicated for the item "LICENSE KEY" of the application configuration information for the duplication source electronic device 12A. Further, the license key of the duplication source and the device configuration information ID of the duplication source are stored for the item "LICENSE KEY" of the application configuration information for the duplication destination electronic device 12B in order to indicate that the license is being transferred. Because the license is being transferred in the present case, a new license key is not necessary. Thus, the device configuration information duplication process unit 48 of the client apparatus 14 may display a device configuration information management screen as illustrated in FIG. 43, for example, without displaying a license key input screen. FIG. 43 is a diagram illustrating an example device configuration information management screen displayed by the client apparatus 14 when device configuration information is duplicated. Note that in the case where a license is being transferred, the processes of steps S117 to S119 of FIG. 35 may be omitted.

Also, when duplicating device configuration information for multiple devices at once, license transfer can be performed with respect to the first device by the above-described operations for the case where license transfer is necessary. However, with respect to the second device and onward, operations of inputting and registering a new license key to be implemented in the case where license transfer is unnecessary have to be performed. Note that the device configuration information duplication process unit 48 of the client apparatus 14 may be configured to be capable of further adding an application to the duplicated device configuration information displayed in the device configuration information management screen of FIG. 43, for example.

<<Data Transfer Operation at Duplication Source Electronic Device>>

Figure 44:
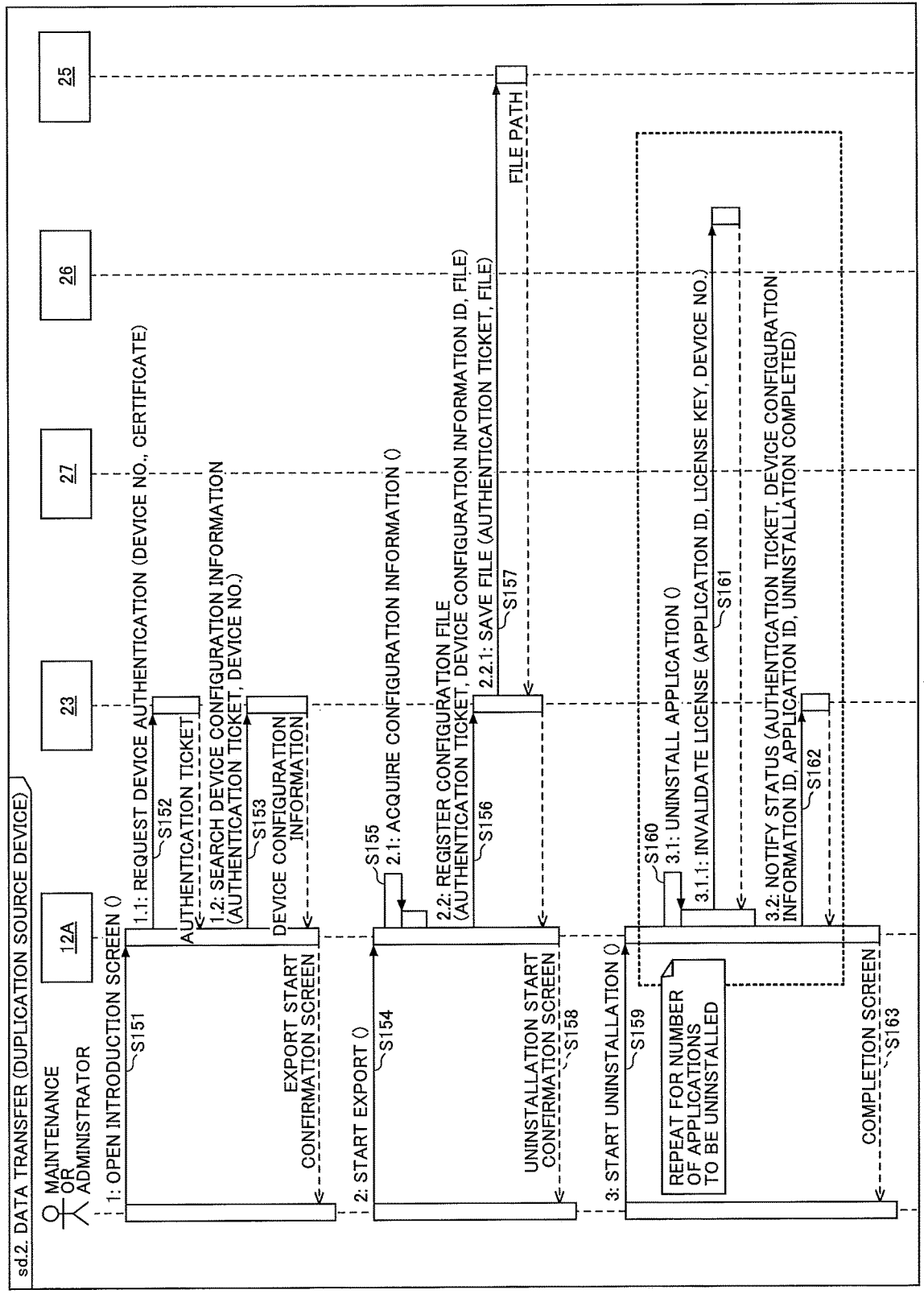
FIG. 44 is a sequence chart illustrating an example data transfer operation executed by an electronic device corresponding to a duplication source.

FIG. 44 is a sequence chart illustrating an example data transfer operation performed at the duplication source electronic device 12A. Because the duplication source electronic device 12A is already registered, the device configuration information of the electronic device 12A may be identified through device authentication. Note that FIG. 44 illustrates an example case where the data transfer operation of the electronic device 12A is started by performing device authentication. However, in other examples, the data transfer operation of the electronic device 12A may be started by a login operation by the administrator (user authentication), for example.

Note that processes of steps S151 to S152 of FIG. 44 are substantially the same as the processes of steps S51 to S52 of FIG. 30. When device authentication is successful, the device configuration information search unit 63 of the electronic device 12A specifies its device number and requests the device configuration management unit 23 of the server apparatus 10 to search for relevant device configuration information based on the specified device number in step S153. The device configuration management unit 23 searches the device configuration information table 28 for device configuration information having the specified device number registered therein and returns the search result to the electronic device 12A.

When device configuration information having a status other than "COMPLETED" is returned to the electronic device 12A, the device configuration application of the electronic device 12A performs process operations for introducing applications and applying setting with respect to the device configuration information as illustrated in FIG. 30. When no device configuration information is returned, the device configuration application of the electronic device 12A ends the present process.

Figures 45, 46:
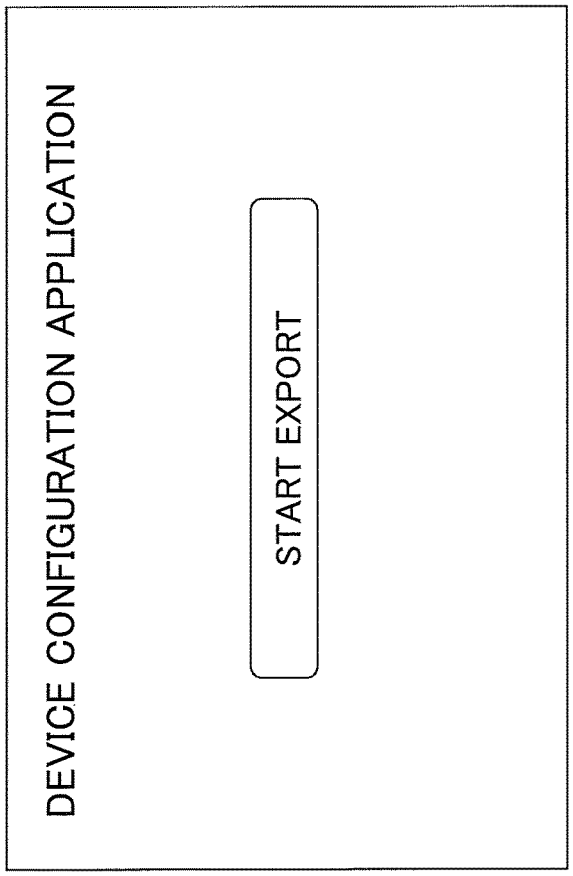
FIG. 45 illustrates an example export start confirmation screen.
FIG. 46 illustrates an example device configuration information table having a record in which a file path to a configuration file has been registered.

When device configuration information having "COMPLETED" registered as its status and "EXPORTING" indicated for the item "CONFIGURATION FILE" is returned, the device configuration application of the electronic device 12A may display an export start confirmation screen as illustrated in FIG. 45, for example, to acquire confirmation from the administrator for starting an export process. FIG. 45 is a diagram illustrating an example export start confirmation screen.

In step S154, when the administrator presses a "START EXPORT" button on the export start confirmation screen of FIG. 45, the electronic device 12A accepts the operation by the administrator as an instruction to start the export process. In step S155, the application transfer process unit 68 of the electronic device 12A acquires setting values of modules stored in a secondary storage area to create a configuration file.

Then, in step S156, the application transfer process unit 68 specifies the device configuration information ID of the device configuration information to be duplicated and requests the device configuration management unit 23 of the server apparatus 10 to register the configuration file. In step S157, in response to the registration request from the electronic device 12A, the device configuration management unit 23 causes the file management unit 25 to store the new configuration file. The file management unit 25 returns a file path to the stored configuration file to the device configuration management unit 23. Then, the device configuration management unit 23 registers the file path to the configuration file in the item "CONFIGURATION FILE" of the device configuration information to be duplicated as illustrated in FIG. 46, for example. FIG. 46 is a diagram illustrating an example device configuration information table including a record having a file path to an exported configuration file registered therein.

Figures 47, 48:
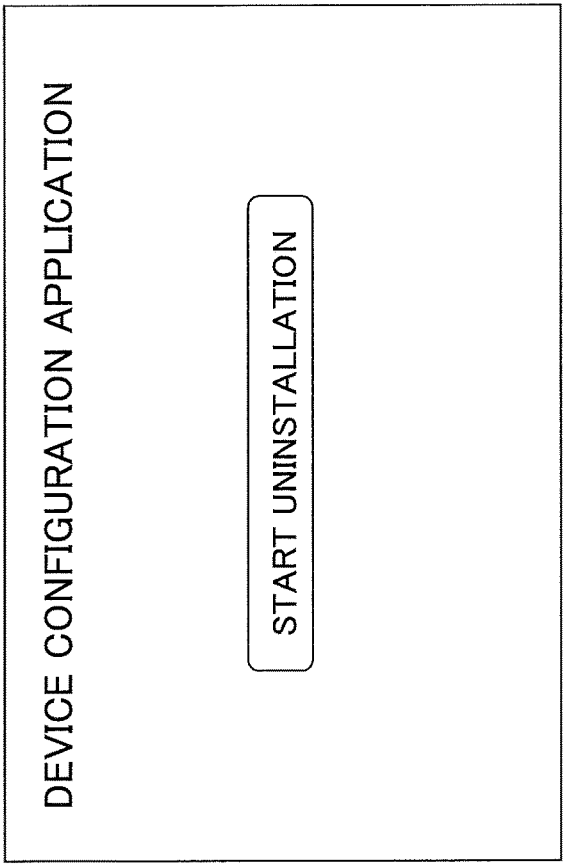
FIG. 47 illustrates an example uninstallation start confirmation screen.
FIG. 48 illustrates an example application configuration information table having a record with data indicating that a corresponding application has been uninstalled.

When application configuration information associated with the device configuration information to be duplicated has data "INVALIDATING" stored for the item "LICENSE KEY", the application transfer process unit 68 of the electronic device 12A proceeds to step S158. In step S158, the application transfer process unit 68 displays an uninstallation start confirmation screen as illustrated in FIG. 47, for example, to acquire confirmation from the administrator to start an uninstallation process. FIG. 47 is a diagram illustrating an example uninstallation start confirmation screen.

In step S159, when the administrator presses a "START UNINSTALLATION" button on uninstallation start confirmation screen of FIG. 47, electronic device 12A accepts the operation by the administrator as an instruction to start the uninstallation process. Note that processes of steps S160 to S162 are repeated a number of times equal to the number of applications to be uninstalled.

In step S160, the application transfer process unit 68 uninstalls the application with the application configuration information having "INVALIDATING" stored for the item "LICENSE KEY". In step S161, the application transfer process unit 68 specifies the application ID, the license key, and the device number, and requests the license management unit 26 to invalidate the license for the application.

Then, in step S162, the status notification unit 67 of the electronic device 12A sends an uninstallation completion notification, specifying the device configuration information ID and the application ID, to the device configuration management unit 23 of the server apparatus 10. When uninstallation of the application is completed, the device configuration management unit 23 changes data stored for the item "LICENSE KEY" from "INVALIDATING" to "UNINSTALLED" as illustrated FIG. 48, for example. FIG. 48 is a diagram illustrating an example of application configuration information having the data "UNINSTALLED" is stored for the item "LICENSE KEY".

Note that in some embodiments, the device configuration management unit 23 may delete the record associated with the application for which a license has been invalidated from the application configuration information table 29. Also, note that although a license for an application is invalidated during an uninstallation process in the operation illustrated in FIG. 44, the license can also be invalidated without uninstalling the application.

Also, although the uninstallation completion notification is sent from the electronic device 12A to the device configuration management unit 23 in step S162, in alternative embodiments, the license management unit 26 that has received the license invalidation request may be configured to notify the device configuration management unit 23 that the license has been invalidated, for example. In this case, the data stored in the item "LICENSE KEY" of the application configuration information may be changed from "INVALIDATING" to "INVALIDATED", for example.

After repeating the processes of steps S160 to S162 for the number of applications to be uninstalled, the application transfer process unit 68 of the electronic device 12A displays a data transfer completion screen in step S163.

<<Application Introduction Operation at Duplication Destination Electronic Device>>

An application introduction operation performed at the duplication destination electronic device 12B is similar to the application introduction operation illustrated in FIG. 21 except for the processes described below. The application introduction operation performed at the duplication destination electronic device 12B differs from the operation of FIG. 21 in that the electronic device 12B confirms whether process operations for transferring data from the duplication source electronic device 12A (application installation and application of configuration file) have been completed.

For example, when one record of device configuration information is added to the device configuration information table 28 as illustrated in FIG. 46, the device configuration information with the device configuration information ID "Conf_0000006" is returned to the electronic device 12B in response to a search request for relevant device configuration information sent to the device configuration management unit 23 of the server apparatus 10 in step S33. When device configuration information is duplicated for multiple devices at once, a device configuration information list including multiple records of device configuration information may be returned to electronic device 12B in response to a search request made in step S33, and the administrator may be prompted to make a selection from the plurality of records of device configuration information.

After the electronic device 12B is registered in step S35, the device number of the electronic device 12B may be registered in the device configuration information table of FIG. 46 as illustrated in FIG. 49, for example. FIG. 49 is a diagram illustrating an example device configuration information table in which the device number of the duplication destination electronic device is registered in device configuration information for the duplication destination electronic device. That is, in FIG. 49, the device number "Dev_000003" is registered in the device configuration information with the device configuration information ID "Conf_0000006".

When installing an application in steps S36 to S39, if license transfer is to be performed, the electronic device 12B has to wait until invalidation of the license in the duplication source electronic device 12A is completed. The electronic device 12B can determine whether license invalidation has been completed based on the application configuration information associated with the device configuration information with the device configuration information ID "Conf_0000006" in FIG. 49, for example. Referring to the application configuration information of FIG. 42, as an example, the electronic device 12B can determine that the license of the application with the application ID "Paid-App_002" is being transferred from the device configuration information ID "Conf_0000003" and that license invalidation has not yet been completed.

If it is determined that license invalidation has not been completed, the electronic device 12B performs processes up to the application installation process of step S37 and waits without proceeding to step S38 and subsequent process steps until it is determined that license invalidation has been completed.

Specifically, the electronic device 12B acquires the application configuration information associated with the device configuration information ID "Conf_0000003" from the server apparatus 10 at predetermined time intervals and waits until data for the item "LICENSE KEY" changes to "UNINSTALLED". Upon detecting the data change, the electronic device 12B performs the processes of step S38 and subsequent process steps.

Because the license key "Lic_002_000001" is once released by the above process, the electronic device 12B can validate the license key "Lic_002_000001" in step S38. Then, the process proceeds to step S39 where the status notification unit 67 of the electronic device 12B notifies the device configuration management unit 23 of the server apparatus 10 that the application installation has been completed.

Then, the device configuration management unit 23 updates the item "LICENSE KEY" of the application configuration information associated with the specified device configuration information ID to "Lic_002_000001" as illustrated in FIG. 50.

Also, the electronic device 12B has to wait for the completion of the export process of exporting the configuration file of the duplication source electronic device 12A before proceeding to the processes of steps S40 to S42 for applying the settings of the configuration file. For example, the electronic device 12B can determine whether the export process for exporting the configuration file registered in association with the device configuration information ID "Conf_0000003" has been completed based on the device configuration information with the device configuration information ID "Conf_0000006" indicated in FIG. 49. In the case where the device configuration information is in the state as illustrated in FIG. 38, for example, the electronic device 12B can determine that export of the configuration file has not been completed based on the data "EXPORTING" stored for the item "CONFIGURATION FILE" of the device configuration information with the device configuration information ID "Conf_0000003". If it is determined that export of the configuration file has not been completed, the electronic device 12B waits without proceeding to the process of step S40.

Specifically, the electronic device 12B acquires the device configuration information with the device configuration information ID "Conf_0000003" from the server apparatus 10 at predetermined time intervals and waits until the file path to the configuration file is registered in the item "CONFIGURATION FILE".

After detecting that a file path has been registered, the electronic device 12B performs the process of step S40. The electronic device 12B specifies the file path and acquires the configuration file from the server apparatus 10. Then in step S41, the electronic device 12B applies the settings specified in the acquired configuration file.

Then, in step S42, the status notification unit 67 of the electronic device 12B notifies the device configuration management unit 23 of the server apparatus 10 that setting application has been completed. Then, the device configuration management unit 23 updates data for the item "CONFIGURATION FILE" of the specified device configuration information to "Prefs_0000004.xml" as illustrated in FIG. 51.

<<Electronic Device Process Flow>>

Figure 52:
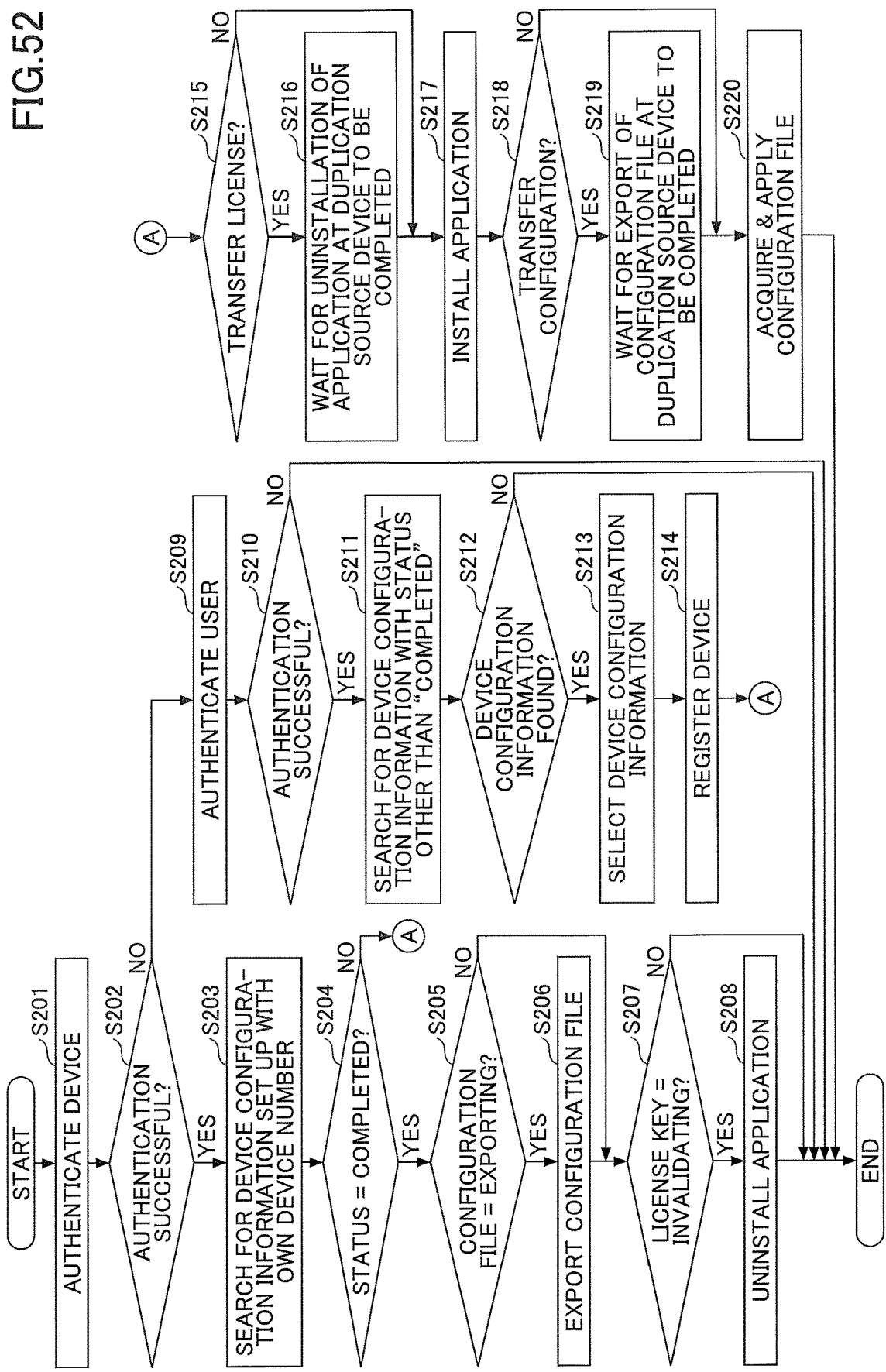
FIG. 52 is a flowchart illustrating example process operations of the electronic device.

The above-described operations may be implemented by process operations of the electronic device 12 as illustrated in FIG. 52, for example. FIG. 52 is a flowchart illustrating example process operations of the electronic device 12. Note that in FIG. 52, screen display operations, user input operations, and process loops are omitted.

In step S201, the electronic device 12 starts by performing device authentication. Note that it is assumed in the present example that device authentication will be successful only when device registration of the electronic device 12 is completed. Steps S203 to S208 correspond to the processes of the duplication source electronic apparatus 12A. Steps S209 to S220 correspond to processes of the duplication destination electronic device 12B (or the electronic device 12 that introduces an application independently). Note that example processes executed in the example operation scenario of FIG. 33 are described below.

In step S201, the electronic device 12A or 12B performs device authentication. In the case where the electronic device 12A performs the device authentication, device authentication will be successful (YES in step S202) such that the process proceeds to step S203. In the case where the electronic device 12B performs device authentication, the device authentication will be unsuccessful (NO in step S202) such that the process proceeds to step S209.

In step S203, the electronic device 12A searches out device configuration information having its own device number registered therein from the server apparatus 10. If the status of the searched out device configuration information is not "COMPLETED", the electronic device 12A performs the processes from step S215 described below.

If the status of the searched out device configuration information is "COMPLETED", the electronic device 12A proceeds to step S205 and determines whether the item "CONFIGURATION FILE" of the searched out device configuration information is indicated as "EXPORTING".

If the item "CONFIGURATION FILE" of the searched out device configuration information is being exported (YES in step S205), the electronic device 12A proceeds to step S206 to export the configuration file, and then proceeds to step S207. If the item "CONFIGURATION FILE" of the searched out device configuration information is not being exported (NO in step S205), the electronic device 12A skips the export process of step S206.

In step S207, the electronic device 12A determines whether the item "LICENSE KEY" of application configuration information associated with the searched out device configuration information is indicated as "INVALIDATING". If the item "LICENSE KEY" is indicated as being invalidated (YES in step S207), the electronic device 12A proceeds to step S208. In step S208, the electronic device 12A performs an application uninstallation process. If the item "LICENSE KEY" is not being invalidated (NO in step S207), the electronic device 12A skips the application uninstallation process of step S208 and ends the process of FIG. 52.

The electronic device 12B that proceeds to step S209 after the device authentication process of step S201 performs user authentication. If the user authentication is successful (YES in step S210), the process proceeds to step S211. If the user authentication is not successful (NO in step S210), the electronic device 12B ends the process of FIG. 52.

In step S211, the electronic device 12B searches out device configuration information with a status other than "COMPLETED" from the server apparatus 100. If there is no device configuration information with a status other than "COMPLETED" (NO in step S212), the electronic device 12B ends the process of FIG. 52.

If there is device configuration information with a status other than "COMPLETED" (YES in step S212), the electronic device 12B accepts a selection of device configuration information from a user (administrator or maintenance person) in step S213. Then, in step S214, the electronic device 12B performs device registration by registering its device number in association with the selected device configuration information in the server apparatus 10. After step S214, the electronic device 12B proceeds to step S215 to determine whether license transfer is to be performed.

If the electronic device 12B is to perform license transfer (YES in step S215), the process proceeds to step S216 where the electronic device 12B waits for the application uninstallation process of the duplication source electronic device 12A to be completed.

When the application uninstallation process of the duplication source electronic device 12A is completed, the electronic device 12B proceeds to step S217. On the other hand, if the electronic device 12B does not have to perform license transfer (NO in step S215), the electronic device 12B skips the process of step S216 and proceeds to step S217.

In step S217, the electronic device 12B performs an application installation process. Then, in step S218, the electronic device 12B determines whether a configuration file is to be transferred from the duplicate source electronic device 12A. If the configuration file has to be transferred (YES in step S218), the electronic device 12B proceeds to step S219 where it waits for the configuration file export process of the duplication source electronic device 12A to be completed.

When the configuration file export process of the duplication source electronic device 12A is completed, the electronic device 12B proceeds to step S220. If the configuration file does not have to be transferred (NO in step S218), the electronic device 12B skips the process of step S219 and proceeds to step S220. In step S220, the electronic device 12B acquires the configuration file from the server apparatus 10 and performs a process of applying the settings of the configuration file.

Note that in a case where the device number of the duplication destination electronic device 12B is known in advance, device configuration information may be stored in association with a device number at the time the device configuration information is generated such that the electronic device 12B may be able perform an application introduction process through device authentication as in the operation scenario of FIG. 33, for example. In this case, an input field for inputting a device number may be provided in the device configuration information duplication screen of FIG. 37, and the device number of the duplication destination electronic device 12B may be stored at the time the device configuration information is duplicated.

According to an aspect of the second embodiment, operations for introducing an application and applying settings of a configuration file to an electronic device 12 that is provided as a replacement or an addition may be facilitated.

Although the present invention has been described above with reference to certain illustrative embodiments, the present invention is not limited to these embodiments, and numerous variations and modifications may be made without departing from the scope of the present invention.

What is claimed is:

1. An information processing system comprising:
an information processing apparatus; and
an image forming apparatus, wherein
the information processing apparatus includes
a first processor configured to execute a first program stored in a first memory to implement processes of
storing and managing at least one of organization identification information or device identification information in association with configuration information that is necessary for introducing an application to the image forming apparatus, wherein
the organization identification information uniquely identifies an organization,
the device identification information uniquely identifies the image forming apparatus, and
the configuration information includes a list of one or more applications to be introduced and license information associated with the one or more applications that is necessary for introducing the one or more applications; and
storing the one or more applications, and
the image forming apparatus includes
a second processor configured to execute a second program stored in a second memory to implement processes of
sending a configuration information acquisition request to acquire the configuration information from the information processing apparatus, the configuration information acquisition request including at least one of the organization identification information or the device identification information;
acquiring the configuration information from the information processing apparatus, the configuration information being stored in association with the at least one of the organization identification information or the device identification information included in the configuration information acquisition request, and including the list of one or more applications and the license information;

acquiring the one or more applications from the information processing apparatus based on the acquired configuration information and introducing the acquired one or more applications; and sending a notification to the information processing apparatus that includes information indicating that the introduction of the acquired one or more applications has been completed upon completion of the introduction of the acquired one or more applications, and wherein the information processing apparatus updates status information associated with the configuration information to indicate that introduction to the image forming apparatus of the one or more applications included in the list of the configuration information is completed upon receiving the notification that the introduction of the acquired one or more application has been completed, the first processor stores and manages the configuration information in association with a setting to be applied to the image forming apparatus when the one or more applications are introduced to the image forming apparatus, and the second processor of the image forming apparatus, at which the one or more applications are introduced, applies the setting based on the acquired configuration information after the introduction of the one or more applications.

2. The information processing system according to claim 1, wherein
the configuration information acquisition request includes the organization identification information, and
the second processor acquires the configuration information that is associated with the organization identification information from the information processing apparatus.

3. The information processing system according to claim 1, wherein
the configuration information acquisition request includes the device identification information, and
the second processor acquires the configuration information that is associated with the specified device identification information from the information processing apparatus.

4. The information processing system according to claim 2, wherein
the first processor stores and manages a plurality of sets of the configuration information in association with the organization identification information; and
the second processor further implements processes of
specifying the organization identification information and acquiring the plurality of sets of configuration information that are associated with the specified organization identification information from the information processing apparatus;
prompting a user to select one set of configuration information from the plurality of sets of configuration information acquired from the information processing apparatus; and
introducing the one or more applications to the image forming apparatus based on the one set of configuration information selected by the user.

5. The information processing system according to claim 4, wherein
the second processor displays a selection screen for enabling the user to select the one set of configuration information from the plurality of sets of configuration information and displays information for enabling the user to distinguish the one or more applications on the selection screen.

6. The information processing system according to claim 4, wherein
the first processor stores and manages the configuration information in association with information for enabling the user to distinguish the image forming apparatus that is to use the configuration information; and
the second processor displays a selection screen for enabling the user to select the one set of configuration information from the plurality of sets of configuration information and displays information for enabling the user to distinguish the configuration information on the selection screen.

7. The information processing system according to claim 4, wherein
when the plurality of sets of configuration information have the same content, the first processor automatically selects the one set of configuration information without prompting the user to select the one set of configuration information from the plurality of sets of configuration information.

8. The information processing system according to claim 1, wherein
the first processor stores and manages the configuration information in association with a setting to be applied to the one or more applications that have been introduced to the image forming apparatus; and
the second processor applies the setting to the one or more applications that have been introduced to the image forming apparatus based on the acquired configuration information.

9. The information processing system according to claim 1, wherein
when the second processor is unable to acquire the configuration information from the information processing apparatus, the second processor requests the first processor to generate new configuration information; and
the first processor automatically generates the new configuration information based on default application information.

10. The information processing system according to claim 1, further comprising an additional, in which the one or more applications is not yet installed, wherein
with respect to the configuration information that has been used to introduce the one or more applications to the image forming apparatus, the first processor stores and manages a list of the one or more applications that have been introduced to the image forming apparatus in association with the license information that has been used to introduce the one or more applications to the image forming apparatus, and duplicates the configuration information of the image forming apparatus in response to a duplication request; and the second processor of the additional image forming apparatus acquires the duplicated configuration information from the information processing apparatus.

11. The information processing system according to claim 10, wherein
the first processor invalidates the license information that is registered in association with the image forming apparatus, corresponding to a duplication source of the configuration information, in response to the duplication request that specifies that the license information is to be transferred from the image forming apparatus corresponding to the duplication source to the additional image forming apparatus, corresponding to a duplication destination; and
after the license information registered in association with the image forming apparatus is invalidated, the additional image forming apparatus acquires the one or more applications from the information processing apparatus based on the acquired duplicated configuration information and introduces the acquired one or more applications.

12. The information processing system according to claim 10, wherein
the first processor stores and manages the duplicated configuration information in association with the organization identification information; and
the image forming apparatus corresponding to the duplication destination specifies the organization identification information, acquires the duplicated configuration information associated with the specified organization identification information from the information processing apparatus, and requests the first processor to register device identification information of the image forming apparatus corresponding to the duplication destination in association with the duplicated configuration information.

13. The information processing system according to claim 10, wherein
the first processor stores and manages the duplicated configuration information in association with the device identification information corresponding to the duplication destination; and
the image forming apparatus corresponding to the duplication destination transmits to the information processing apparatus, a device authentication request specifying the device identification information of the image forming apparatus corresponding to the duplication destination, and acquires from the information processing apparatus, the duplicated configuration information registered in association with the device identification information of the image forming apparatus corresponding to the duplication destination in response to the device authentication request.

14. The information processing system according to claim 12, wherein
the first processor duplicates the configuration information of one duplication source to generate a plurality of sets of duplicated configuration information and manages the plurality of sets of duplicated configuration information in association with the organization identification information; and
the image forming apparatus corresponding to the duplication destination specifies the organization identification information, acquires the plurality of sets of duplicated configuration information associated with the specified organization identification information from the information processing apparatus, prompts a user to select one set of duplicated configuration information from the plurality of sets of duplicated configuration information, and requests the first processor to register device identification information of the image forming apparatus corresponding to the duplication destination in association with the one set of duplicated configuration information selected by the user.

15. The information processing system according to claim 14, wherein
the image forming apparatus corresponding to the duplication destination displays application information of the one or more applications to be introduced when displaying the plurality of duplicated configuration information acquired from the information processing apparatus.

16. The information processing system according to claim 15, wherein
the first processor stores and manages the configuration information in association with description information of the image forming apparatus corresponding to the duplication source or the image forming apparatus corresponding to the duplication destination; and
the image forming apparatus corresponding to the duplication destination displays the description information of the image forming apparatus corresponding to the duplication source or the image forming apparatus corresponding to the duplication destination when displaying the plurality of duplicated configuration information acquired from the information processing apparatus.

17. The information processing system according to claim 1, wherein
a client apparatus registers
the association between the organization identification information and the configuration information, or
the association between the device identification information and the configuration information
in the information processing apparatus.

18. The information processing system according to claim 1, wherein
the image forming apparatus is one of a multifunction peripheral (MFP), a scanner, a printer, a facsimile machine, an electronic blackboard, or a projector.

19. An application introducing method implemented by an information processing system including an information processing apparatus and an image forming apparatus, the method comprising steps of:
the information processing apparatus
storing one or more applications to be introduced to the image forming apparatus; and
storing and managing at least one of organization identification information or device identification information in association with configuration information that is necessary for introducing the one or more applications to the image forming apparatus, wherein the organization identification information uniquely identifies an organization, the device identification information uniquely identifies the image forming apparatus, and the configuration information including a list of the one or more applications to be introduced and license information associated with the one or more applications that is necessary for introducing the one or more applications; and
the image forming apparatus
sending a configuration information acquisition request to acquire the configuration information from the information processing apparatus, the configuration information acquisition request including at least one of the organization identification information or the device identification information;

acquiring the configuration information that is from the information processing apparatus, the configuration information being stored in association with the at least one of the organization identification information or the device identification information included in the configuration information acquisition request, and including the list of one or more applications and the license information;

acquiring the one or more applications from the information processing apparatus based on the acquired configuration information and introducing the acquired one or more applications; and sending a notification to the information processing apparatus that includes information indicating that the introduction of the acquired one or more applications has been completed upon completion of the introduction of the acquired one or more applications, and wherein the information processing apparatus updates status information associated with the configuration information to indicate that introduction to the image forming apparatus of the one or more applications included in the list of the configuration information is completed upon receiving the notification that the introduction of the acquired one or more application has been completed, the information processing apparatus stores and manages the configuration information in association with a setting to be applied to the image forming apparatus when the one or more applications are introduced to the image forming apparatus, and the setting is applied based on the acquired configuration information after the introduction of the one or more applications in the image forming apparatus at which the one or more applications are introduced.

20. An information processing apparatus that is connected to an image forming apparatus via a network and is configured to provide one or more applications to the image forming apparatus, the information processing apparatus comprising:

a memory storing a program; and a processor configured to execute the program to implement processes of storing at least one of organization identification information or device identification information in association with configuration information that is necessary for introducing the one or more applications to the image forming apparatus, wherein the organization identification information uniquely identifies an organization, the device identification information uniquely identifies the image forming apparatus, and the configuration information includes a list of the one or more applications to be introduced and license information associated with the one or more applications that is necessary for introducing the one or more applications;

receiving a configuration information acquisition request to acquire the configuration information from the image forming apparatus, the configuration information acquisition request including at least one of the organization identification information or the device identification information;

providing to the image forming apparatus, the configuration information that is stored in association with the at least one of the organization identification information or the device identification information included in the configuration information acquisition request, and that includes the list of one or more applications and the license information;

storing the one or more applications to be introduced and providing the one or more applications to the image forming apparatus in response to a request from the image forming apparatus based on the configuration information provided to the image forming apparatus;

receiving a notification including information indicating that the introduction of the acquired one or more applications has been completed from the image forming apparatus upon completion of the introduction of the acquired one or more applications; and updating status information associated with the configuration information to indicate that introduction of the one or more applications included in the list of the configuration information to the image forming apparatus has been completed upon receiving the notification that the introduction of the acquired one or more application has been completed, wherein the processor stores and manages the configuration information in association with a setting to be applied to the image forming apparatus when the one or more applications are introduced to the image forming apparatus, and the setting based on the acquired configuration information is applied after the introduction of the one or more applications in the image forming apparatus at which the one or more applications are introduced.

\* \* \* \* \*